(12) United States Patent
Heikura et al.

(10) Patent No.: US 9,350,081 B2
(45) Date of Patent: May 24, 2016

(54) SWITCHABLE MULTI-RADIATOR HIGH BAND ANTENNA APPARATUS

(71) Applicant: PULSE FINLAND OY, Kempele (FI)

(72) Inventors: Ilkka Heikura, Kempele (FI); Petteri Annamaa, Oulunsalo (FI)

(73) Assignee: Pulse Finland OY (FI)

( * ) Notice: Subject to any disclaimer, the term of this patent is extended or adjusted under 35 U.S.C. 154(b) by 78 days.

(21) Appl. No.: 14/155,000

(22) Filed: Jan. 14, 2014

(65) Prior Publication Data
US 2015/0200463 A1 Jul. 16, 2015

(51) Int. Cl.
| | |
|---|---|
| H04B 1/38 | (2015.01) |
| H01Q 9/04 | (2006.01) |
| H01Q 1/24 | (2006.01) |
| H04B 1/40 | (2015.01) |
| H04B 1/00 | (2006.01) |
| H04B 1/04 | (2006.01) |

(Continued)

(52) U.S. Cl.
CPC ............ *H01Q 9/0442* (2013.01); *H01Q 1/243* (2013.01); *H04B 1/006* (2013.01); *H04B 1/0458* (2013.01); *H04B 1/18* (2013.01); *H04B 1/40* (2013.01); *H04B 1/1009* (2013.01)

(58) Field of Classification Search
CPC ......... H04Q 9/0442; H04Q 1/243; H04B 1/40
USPC ........ 455/78, 82, 83, 87, 550.1, 552.1, 562.1, 455/575.5, 129, 193.2, 269, 73
See application file for complete search history.

(56) References Cited

U.S. PATENT DOCUMENTS

| | | | |
|---|---|---|---|
| 2,745,102 | A | 5/1956 | Norgorden |
| 3,938,161 | A | 2/1976 | Sanford |

(Continued)

FOREIGN PATENT DOCUMENTS

| | | |
|---|---|---|
| CN | 1316797 | 10/2007 |
| DE | 10104862 | 8/2002 |

(Continued)

OTHER PUBLICATIONS

"An Adaptive Microstrip Patch Antenna for Use in Portable Transceivers", Rostbakken et al., Vehicular Technology Conference, 1996, Mobile Technology for the Human Race, pp. 339-343.

(Continued)

*Primary Examiner* — Tuan Pham
(74) *Attorney, Agent, or Firm* — Gazdzinski & Associates, PC

(57) ABSTRACT

Switchable multi-radiator high band antenna apparatus, and methods of tuning and utilizing the same. In one embodiment, the antenna apparatus is configured to operate in lower and upper frequency bands, for use within a handheld mobile device (e.g., cellular telephone or smartphone). In one variant, the antenna apparatus includes a metal cup, two feeding elements, and a ground element. One feeding element is used to tune the antenna in both the lower and the upper bands. The other feed element is used to tune the antenna in the upper band. A switching element is configured to change the signal routing for the feed elements. During device operation, a user's body (e.g., hand) may cover or obstruct one of the antenna elements. Responsive to a determination of reduced performance associated with covered/obstructed antenna element, the signal route may be automatically switched to the other element, thereby improving robustness of mobile device communications.

21 Claims, 23 Drawing Sheets

(51) Int. Cl.
  *H04B 1/18* (2006.01)
  *H04B 1/10* (2006.01)

(56) References Cited

U.S. PATENT DOCUMENTS

| | | |
|---|---|---|
| 4,004,228 A | 1/1977 | Mullett |
| 4,028,652 A | 6/1977 | Wakino et al. |
| 4,031,468 A | 6/1977 | Ziebell et al. |
| 4,054,874 A | 10/1977 | Oltman |
| 4,069,483 A | 1/1978 | Kaloi |
| 4,123,756 A | 10/1978 | Nagata et al. |
| 4,123,758 A | 10/1978 | Shibano et al. |
| 4,131,893 A | 12/1978 | Munson et al. |
| 4,201,960 A | 5/1980 | Skutta et al. |
| 4,255,729 A | 3/1981 | Fukasawa et al. |
| 4,313,121 A | 1/1982 | Campbell et al. |
| 4,356,492 A | 10/1982 | Kaloi |
| 4,370,657 A | 1/1983 | Kaloi |
| 4,423,396 A | 12/1983 | Makimoto et al. |
| 4,431,977 A | 2/1984 | Sokola et al. |
| 4,546,357 A | 10/1985 | Laughon et al. |
| 4,559,508 A | 12/1985 | Nishikawa et al. |
| 4,625,212 A | 11/1986 | Oda et al. |
| 4,652,889 A | 3/1987 | Bizouard et al. |
| 4,661,992 A | 4/1987 | Garay et al. |
| 4,692,726 A | 9/1987 | Green et al. |
| 4,703,291 A | 10/1987 | Nishikawa et al. |
| 4,706,050 A | 11/1987 | Andrews |
| 4,716,391 A | 12/1987 | Moutrie et al. |
| 4,740,765 A | 4/1988 | Ishikawa et al. |
| 4,742,562 A | 5/1988 | Kommrusch |
| 4,761,624 A | 8/1988 | Igarashi et al. |
| 4,800,348 A | 1/1989 | Rosar et al. |
| 4,800,392 A | 1/1989 | Garay et al. |
| 4,821,006 A | 4/1989 | Ishikawa et al. |
| 4,823,098 A | 4/1989 | DeMuro et al. |
| 4,827,266 A | 5/1989 | Sato et al. |
| 4,829,274 A | 5/1989 | Green et al. |
| 4,835,538 A | 5/1989 | McKenna et al. |
| 4,835,541 A | 5/1989 | Johnson et al. |
| 4,862,181 A | 8/1989 | PonceDeLeon et al. |
| 4,879,533 A | 11/1989 | De Muro et al. |
| 4,896,124 A | 1/1990 | Schwent |
| 4,907,006 A | 3/1990 | Nishikawa et al. |
| 4,954,796 A | 9/1990 | Green et al. |
| 4,965,537 A | 10/1990 | Kommrusch |
| 4,977,383 A | 12/1990 | Niiranen |
| 4,980,694 A | 12/1990 | Hines |
| 5,016,020 A | 5/1991 | Simpson |
| 5,017,932 A | 5/1991 | Ushiyama et al. |
| 5,043,738 A | 8/1991 | Shapiro et al. |
| 5,047,739 A | 9/1991 | Kuokkanene |
| 5,053,786 A | 10/1991 | Silverman et al. |
| 5,057,847 A | 10/1991 | Vaeisaenen |
| 5,061,939 A | 10/1991 | Nakase |
| 5,097,236 A | 3/1992 | Wakino et al. |
| 5,103,197 A | 4/1992 | Turunen |
| 5,109,536 A | 4/1992 | Kommrusch |
| 5,155,493 A | 10/1992 | Thursby et al. |
| 5,157,363 A | 10/1992 | Puurunen |
| 5,159,303 A | 10/1992 | Flink |
| 5,166,697 A | 11/1992 | Viladevall et al. |
| 5,170,173 A | 12/1992 | Krenz et al. |
| 5,203,021 A | 4/1993 | Repplinger et al. |
| 5,210,510 A | 5/1993 | Karsikas |
| 5,210,542 A | 5/1993 | Pett et al. |
| 5,220,335 A | 6/1993 | Huang |
| 5,229,777 A | 7/1993 | Doyle |
| 5,239,279 A | 8/1993 | Turunen |
| 5,278,528 A | 1/1994 | Turunen |
| 5,281,326 A | 1/1994 | Galla |
| 5,298,873 A | 3/1994 | Ala-Kojola |
| 5,302,924 A | 4/1994 | Jantunen |
| 5,304,968 A | 4/1994 | Ohtonen |
| 5,307,036 A | 4/1994 | Turunen |
| 5,319,328 A | 6/1994 | Turunen |
| 5,349,315 A | 9/1994 | Ala-Kojola |
| 5,349,700 A | 9/1994 | Parker |
| 5,351,023 A | 9/1994 | Niiranen |
| 5,354,463 A | 10/1994 | Turunen |
| 5,355,142 A | 10/1994 | Marshall et al. |
| 5,357,262 A | 10/1994 | Blaese |
| 5,363,114 A | 11/1994 | Shoemaker |
| 5,369,782 A | 11/1994 | Kawano et al. |
| 5,382,959 A | 1/1995 | Pett et al. |
| 5,386,214 A | 1/1995 | Sugawara |
| 5,387,886 A | 2/1995 | Takalo |
| 5,394,162 A | 2/1995 | Korovesis et al. |
| RE34,898 E | 4/1995 | Turunen |
| 5,408,206 A | 4/1995 | Turunen |
| 5,418,508 A | 5/1995 | Puurunen |
| 5,432,489 A | 7/1995 | Yrjola |
| 5,438,697 A | 8/1995 | Fowler et al. |
| 5,440,315 A | 8/1995 | Wright et al. |
| 5,442,366 A | 8/1995 | Sanford |
| 5,444,453 A | 8/1995 | Lalezari |
| 5,467,065 A | 11/1995 | Turunen |
| 5,473,295 A | 12/1995 | Turunen |
| 5,506,554 A | 4/1996 | Ala-Kojola |
| 5,508,668 A | 4/1996 | Prokkola |
| 5,510,802 A | 4/1996 | Tsuru |
| 5,517,683 A | 5/1996 | Collett et al. |
| 5,521,561 A | 5/1996 | Yrjola |
| 5,526,003 A | 6/1996 | Ogawa et al. |
| 5,532,703 A | 7/1996 | Stephens et al. |
| 5,541,560 A | 7/1996 | Turunen |
| 5,541,617 A | 7/1996 | Connolly et al. |
| 5,543,764 A | 8/1996 | Turunen |
| 5,550,519 A | 8/1996 | Korpela |
| 5,557,287 A | 9/1996 | Pottala et al. |
| 5,557,292 A | 9/1996 | Nygren et al. |
| 5,566,441 A | 10/1996 | Marsh et al. |
| 5,570,071 A | 10/1996 | Ervasti |
| 5,585,771 A | 12/1996 | Ervasti |
| 5,585,810 A | 12/1996 | Tsuru et al. |
| 5,589,844 A | 12/1996 | Belcher et al. |
| 5,594,395 A | 1/1997 | Niiranen |
| 5,604,471 A | 2/1997 | Rattila |
| 5,627,502 A | 5/1997 | Ervasti |
| 5,649,316 A | 7/1997 | Prodhomme et al. |
| 5,668,561 A | 9/1997 | Perrotta et al. |
| 5,675,301 A | 10/1997 | Nappa |
| 5,689,221 A | 11/1997 | Niiranen |
| 5,694,135 A | 12/1997 | Dikun et al. |
| 5,696,517 A | 12/1997 | Kawahata et al. |
| 5,703,600 A | 12/1997 | Burrell et al. |
| 5,709,823 A | 1/1998 | Hayes et al. |
| 5,711,014 A | 1/1998 | Crowley et al. |
| 5,717,368 A | 2/1998 | Niiranen |
| 5,731,749 A | 3/1998 | Yrjola |
| 5,734,305 A | 3/1998 | Ervasti |
| 5,734,350 A | 3/1998 | Deming et al. |
| 5,734,351 A | 3/1998 | Ojantakanen |
| 5,739,735 A | 4/1998 | Pyykko |
| 5,742,259 A | 4/1998 | Annamaa |
| 5,757,327 A | 5/1998 | Yajima et al. |
| 5,760,746 A | 6/1998 | Kawahata |
| 5,764,190 A | 6/1998 | Murch et al. |
| 5,767,809 A | 6/1998 | Chuang et al. |
| 5,768,217 A | 6/1998 | Sonoda et al. |
| 5,777,581 A | 7/1998 | Lilly et al. |
| 5,777,585 A | 7/1998 | Tsuda et al. |
| 5,793,269 A | 8/1998 | Ervasti |
| 5,797,084 A | 8/1998 | Tsuru et al. |
| 5,812,094 A | 9/1998 | Maldonado |
| 5,815,048 A | 9/1998 | Ala-Kojola |
| 5,822,705 A | 10/1998 | Lehtola |
| 5,852,421 A | 12/1998 | Maldonado |
| 5,861,854 A | 1/1999 | Kawahata et al. |
| 5,874,926 A | 2/1999 | Tsuru et al. |
| 5,880,697 A | 3/1999 | McCarrick et al. |
| 5,886,668 A | 3/1999 | Pedersen et al. |
| 5,892,490 A | 4/1999 | Asakura et al. |
| 5,903,820 A | 5/1999 | Hagstrom |

(56) References Cited

U.S. PATENT DOCUMENTS

| | | |
|---|---|---|
| 5,905,475 A | 5/1999 | Annamaa |
| 5,920,290 A | 7/1999 | McDonough et al. |
| 5,926,139 A | 7/1999 | Korisch |
| 5,929,813 A | 7/1999 | Eggleston |
| 5,936,583 A | 8/1999 | Sekine et al. |
| 5,943,016 A | 8/1999 | Snyder, Jr. et al. |
| 5,952,975 A | 9/1999 | Pedersen et al. |
| 5,959,583 A | 9/1999 | Funk |
| 5,963,180 A | 10/1999 | Leisten |
| 5,966,097 A | 10/1999 | Fukasawa et al. |
| 5,970,393 A | 10/1999 | Khorrami et al. |
| 5,977,710 A | 11/1999 | Kuramoto et al. |
| 5,986,606 A | 11/1999 | Kossiavas et al. |
| 5,986,608 A | 11/1999 | Korisch et al. |
| 5,990,848 A | 11/1999 | Annamaa |
| 5,999,132 A | 12/1999 | Kitchener et al. |
| 6,005,529 A | 12/1999 | Hutchinson |
| 6,006,419 A | 12/1999 | Vandendolder et al. |
| 6,008,764 A | 12/1999 | Ollikainen |
| 6,009,311 A | 12/1999 | Killion et al. |
| 6,014,106 A | 1/2000 | Annamaa |
| 6,016,130 A | 1/2000 | Annamaa |
| 6,023,608 A | 2/2000 | Yrjola |
| 6,031,496 A | 2/2000 | Kuittinen et al. |
| 6,034,637 A | 3/2000 | McCoy et al. |
| 6,037,848 A | 3/2000 | Alila |
| 6,043,780 A | 3/2000 | Funk et al. |
| 6,052,096 A | 4/2000 | Tsuru et al. |
| 6,072,434 A | 6/2000 | Papatheodorou |
| 6,078,231 A | 6/2000 | Pelkonen |
| 6,091,363 A | 7/2000 | Komatsu et al. |
| 6,091,365 A | 7/2000 | Derneryd et al. |
| 6,097,345 A | 8/2000 | Walton |
| 6,100,849 A | 8/2000 | Tsubaki et al. |
| 6,112,106 A | 8/2000 | Crowley et al. |
| 6,121,931 A | 9/2000 | Levi et al. |
| 6,133,879 A | 10/2000 | Grangeat et al. |
| 6,134,421 A | 10/2000 | Lee et al. |
| 6,140,966 A | 10/2000 | Pankinaho |
| 6,140,973 A | 10/2000 | Annamaa |
| 6,147,650 A | 11/2000 | Kawahata et al. |
| 6,157,819 A | 12/2000 | Vuokko |
| 6,177,908 B1 | 1/2001 | Kawahata |
| 6,185,434 B1 | 2/2001 | Hagstrom |
| 6,190,942 B1 | 2/2001 | Wilm et al. |
| 6,195,049 B1 | 2/2001 | Kim et al. |
| 6,204,826 B1 | 3/2001 | Rutkowski et al. |
| 6,215,376 B1 | 4/2001 | Hagstrom |
| 6,218,989 B1 | 4/2001 | Schneider et al. |
| 6,246,368 B1 | 6/2001 | Deming et al. |
| 6,252,552 B1 | 6/2001 | Tarvas et al. |
| 6,252,554 B1 | 6/2001 | Isohatala |
| 6,255,994 B1 | 7/2001 | Saito |
| 6,268,831 B1 | 7/2001 | Sanford |
| 6,281,848 B1 | 8/2001 | Nagumo et al. |
| 6,295,029 B1 | 9/2001 | Chen et al. |
| 6,297,776 B1 | 10/2001 | Pankinaho |
| 6,304,220 B1 | 10/2001 | Herve et al. |
| 6,308,720 B1 | 10/2001 | Modi |
| 6,316,975 B1 | 11/2001 | O'Toole et al. |
| 6,323,811 B1 | 11/2001 | Tsubaki |
| 6,326,921 B1 | 12/2001 | Egorov et al. |
| 6,337,663 B1 | 1/2002 | Chi-Minh |
| 6,340,954 B1 | 1/2002 | Annamaa et al. |
| 6,342,859 B1 | 1/2002 | Kurz et al. |
| 6,343,208 B1 | 1/2002 | Ying |
| 6,346,914 B1 | 2/2002 | Annamaa |
| 6,348,892 B1 | 2/2002 | Annamaa |
| 6,353,443 B1 | 3/2002 | Ying |
| 6,366,243 B1 | 4/2002 | Isohatala |
| 6,377,827 B1 | 4/2002 | Rydbeck |
| 6,380,905 B1 | 4/2002 | Annamaa |
| 6,396,444 B1 | 5/2002 | Goward |
| 6,404,394 B1 | 6/2002 | Hill |
| 6,417,813 B1 | 7/2002 | Durham et al. |
| 6,421,014 B1 | 7/2002 | Sanad |
| 6,423,915 B1 | 7/2002 | Winter |
| 6,429,818 B1 | 8/2002 | Johnson et al. |
| 6,452,551 B1 | 9/2002 | Chen |
| 6,452,558 B1 | 9/2002 | Saitou et al. |
| 6,456,249 B1 | 9/2002 | Johnson et al. |
| 6,459,413 B1 | 10/2002 | Tseng et al. |
| 6,462,716 B1 | 10/2002 | Kushihi |
| 6,469,673 B2 | 10/2002 | Kaiponen |
| 6,473,056 B2 | 10/2002 | Annamaa |
| 6,476,767 B2 | 11/2002 | Aoyama et al. |
| 6,476,769 B1 | 11/2002 | Lehtola |
| 6,480,155 B1 | 11/2002 | Eggleston |
| 6,483,462 B2 | 11/2002 | Weinberger |
| 6,498,586 B2 | 12/2002 | Pankinaho |
| 6,501,425 B1 | 12/2002 | Nagumo |
| 6,515,625 B1 | 2/2003 | Johnson |
| 6,518,925 B1 | 2/2003 | Annamaa |
| 6,529,168 B2 | 3/2003 | Mikkola |
| 6,529,749 B1 | 3/2003 | Hayes et al. |
| 6,535,170 B2 | 3/2003 | Sawamura et al. |
| 6,538,604 B1 | 3/2003 | Isohatala |
| 6,538,607 B2 | 3/2003 | Barna |
| 6,542,050 B1 | 4/2003 | Arai et al. |
| 6,549,167 B1 | 4/2003 | Yoon |
| 6,552,686 B2 | 4/2003 | Ollikainen et al. |
| 6,556,812 B1 | 4/2003 | Pennanen et al. |
| 6,566,944 B1 | 5/2003 | Pehlke |
| 6,580,396 B2 | 6/2003 | Lin |
| 6,580,397 B2 | 6/2003 | Lindell |
| 6,600,449 B2 | 7/2003 | Onaka |
| 6,603,430 B1 | 8/2003 | Hill et al. |
| 6,606,016 B2 | 8/2003 | Takamine et al. |
| 6,611,235 B2 | 8/2003 | Barna et al. |
| 6,614,400 B2 | 9/2003 | Egorov |
| 6,614,401 B2 | 9/2003 | Onaka et al. |
| 6,614,405 B1 | 9/2003 | Mikkonen |
| 6,634,564 B2 | 10/2003 | Kuramochi |
| 6,636,181 B2 | 10/2003 | Asano |
| 6,639,564 B2 | 10/2003 | Johnson |
| 6,646,606 B2 | 11/2003 | Mikkola |
| 6,650,295 B2 | 11/2003 | Ollikainen et al. |
| 6,657,593 B2 | 12/2003 | Nagumo et al. |
| 6,657,595 B1 | 12/2003 | Phillips et al. |
| 6,670,926 B2 | 12/2003 | Miyasaka |
| 6,677,903 B2 | 1/2004 | Wang |
| 6,680,705 B2 | 1/2004 | Tan et al. |
| 6,683,573 B2 | 1/2004 | Park |
| 6,693,594 B2 | 2/2004 | Pankinaho et al. |
| 6,717,551 B1 | 4/2004 | Desclos et al. |
| 6,727,857 B2 | 4/2004 | Mikkola |
| 6,734,825 B1 | 5/2004 | Guo et al. |
| 6,734,826 B1 | 5/2004 | Dai et al. |
| 6,738,022 B2 | 5/2004 | Klaavo et al. |
| 6,741,214 B1 | 5/2004 | Kadambi et al. |
| 6,753,813 B2 | 6/2004 | Kushihi |
| 6,759,989 B2 | 7/2004 | Tarvas et al. |
| 6,765,536 B2 | 7/2004 | Phillips et al. |
| 6,774,853 B2 | 8/2004 | Wong et al. |
| 6,781,545 B2 | 8/2004 | Sung |
| 6,801,166 B2 | 10/2004 | Mikkola |
| 6,801,169 B1 | 10/2004 | Chang et al. |
| 6,806,835 B2 | 10/2004 | Iwai |
| 6,819,287 B2 | 11/2004 | Sullivan et al. |
| 6,819,293 B2 | 11/2004 | De Graauw |
| 6,825,818 B2 | 11/2004 | Toncich |
| 6,836,249 B2 | 12/2004 | Kenoun et al. |
| 6,847,329 B2 | 1/2005 | Ikegaya et al. |
| 6,856,293 B2 | 2/2005 | Bordi |
| 6,862,437 B1 | 3/2005 | McNamara |
| 6,862,441 B2 | 3/2005 | Ella |
| 6,873,291 B2 | 3/2005 | Aoyama |
| 6,876,329 B2 | 4/2005 | Milosavljevic |
| 6,882,317 B2 | 4/2005 | Koskiniemi |
| 6,891,507 B2 | 5/2005 | Kushihi et al. |
| 6,897,810 B2 | 5/2005 | Dai et al. |
| 6,900,768 B2 | 5/2005 | Iguchi et al. |
| 6,903,692 B2 | 6/2005 | Kivekas |
| 6,911,945 B2 | 6/2005 | Korva |

(56) References Cited

U.S. PATENT DOCUMENTS

| | | |
|---|---|---|
| 6,922,171 B2 | 7/2005 | Annamaa |
| 6,925,689 B2 | 8/2005 | Folkmar |
| 6,927,729 B2 | 8/2005 | Legay |
| 6,937,196 B2 | 8/2005 | Korva |
| 6,950,065 B2 | 9/2005 | Ying et al. |
| 6,950,066 B2 | 9/2005 | Hendler et al. |
| 6,950,068 B2 | 9/2005 | Bordi |
| 6,950,072 B2 | 9/2005 | Miyata et al. |
| 6,952,144 B2 | 10/2005 | Javor |
| 6,952,187 B2 | 10/2005 | Annamaa |
| 6,958,730 B2 | 10/2005 | Nagumo et al. |
| 6,961,544 B1 | 11/2005 | Hagstrom |
| 6,963,308 B2 | 11/2005 | Korva |
| 6,963,310 B2 | 11/2005 | Horita et al. |
| 6,967,618 B2 | 11/2005 | Ojantakanen |
| 6,975,278 B2 | 12/2005 | Song et al. |
| 6,980,158 B2 | 12/2005 | Iguchi et al. |
| 6,985,108 B2 | 1/2006 | Mikkola |
| 6,992,543 B2 | 1/2006 | Luetzelschwab et al. |
| 6,995,710 B2 | 2/2006 | Sugimoto et al. |
| 7,023,341 B2 | 4/2006 | Stilp |
| 7,031,744 B2 | 4/2006 | Kuriyama et al. |
| 7,034,752 B2 | 4/2006 | Sekiguchi et al. |
| 7,042,403 B2 | 5/2006 | Colburn et al. |
| 7,053,841 B2 | 5/2006 | Ponce De Leon et al. |
| 7,054,671 B2 | 5/2006 | Kaiponen et al. |
| 7,057,560 B2 | 6/2006 | Erkocevic |
| 7,061,430 B2 | 6/2006 | Zheng et al. |
| 7,081,857 B2 | 7/2006 | Kinnunen et al. |
| 7,084,831 B2 | 8/2006 | Takagi et al. |
| 7,099,690 B2 | 8/2006 | Milosavljevic |
| 7,113,133 B2 | 9/2006 | Chen et al. |
| 7,119,749 B2 | 10/2006 | Miyata et al. |
| 7,126,546 B2 | 10/2006 | Annamaa |
| 7,129,893 B2 | 10/2006 | Otaka et al. |
| 7,136,019 B2 | 11/2006 | Mikkola |
| 7,136,020 B2 | 11/2006 | Yamaki |
| 7,142,824 B2 | 11/2006 | Kojima et al. |
| 7,148,847 B2 | 12/2006 | Yuanzhu |
| 7,148,849 B2 | 12/2006 | Lin |
| 7,148,851 B2 | 12/2006 | Takaki et al. |
| 7,170,464 B2 | 1/2007 | Tang et al. |
| 7,176,838 B1 | 2/2007 | Kinezos |
| 7,180,455 B2 | 2/2007 | Oh et al. |
| 7,193,574 B2 | 3/2007 | Chiang et al. |
| 7,205,942 B2 | 4/2007 | Wang et al. |
| 7,215,283 B2 | 5/2007 | Boyle |
| 7,218,280 B2 | 5/2007 | Annamaa |
| 7,218,282 B2 | 5/2007 | Humpfer et al. |
| 7,224,313 B2 | 5/2007 | McKinzie, III et al. |
| 7,230,574 B2 | 6/2007 | Johnson |
| 7,233,775 B2 | 6/2007 | De Graauw |
| 7,237,318 B2 | 7/2007 | Annamaa |
| 7,256,743 B2 | 8/2007 | Korva |
| 7,274,334 B2 | 9/2007 | O'Riordan et al. |
| 7,283,097 B2 | 10/2007 | Wen et al. |
| 7,289,064 B2 | 10/2007 | Cheng |
| 7,292,200 B2 | 11/2007 | Posluszny et al. |
| 7,319,432 B2 | 1/2008 | Andersson |
| 7,330,153 B2 | 2/2008 | Rentz |
| 7,333,067 B2 | 2/2008 | Hung et al. |
| 7,339,528 B2 | 3/2008 | Wang et al. |
| 7,340,286 B2 | 3/2008 | Korva et al. |
| 7,345,634 B2 | 3/2008 | Ozkar et al. |
| 7,355,270 B2 | 4/2008 | Hasebe et al. |
| 7,358,902 B2 | 4/2008 | Erkocevic |
| 7,362,326 B2 | 4/2008 | Korva |
| 7,375,695 B2 | 5/2008 | Ishizuka et al. |
| 7,381,774 B2 | 6/2008 | Bish et al. |
| 7,382,319 B2 | 6/2008 | Kawahata et al. |
| 7,385,556 B2 | 6/2008 | Chung et al. |
| 7,388,543 B2 | 6/2008 | Vance |
| 7,391,378 B2 | 6/2008 | Mikkola |
| 7,405,702 B2 | 7/2008 | Annamaa et al. |
| 7,417,588 B2 | 8/2008 | Castany et al. |
| 7,423,592 B2 | 9/2008 | Pros et al. |
| 7,432,860 B2 | 10/2008 | Huynh |
| 7,439,929 B2 | 10/2008 | Ozkar |
| 7,443,344 B2 | 10/2008 | Boyle |
| 7,468,700 B2 | 12/2008 | Milosavljevic |
| 7,468,709 B2 | 12/2008 | Niemi |
| 7,498,990 B2 | 3/2009 | Park et al. |
| 7,501,983 B2 | 3/2009 | Mikkola |
| 7,502,598 B2 | 3/2009 | Kronberger |
| 7,564,413 B2 | 7/2009 | Kim et al. |
| 7,589,678 B2 | 9/2009 | Perunka et al. |
| 7,616,158 B2 | 11/2009 | Mark et al. |
| 7,633,449 B2 | 12/2009 | Oh |
| 7,663,551 B2 | 2/2010 | Nissinen |
| 7,679,565 B2 | 3/2010 | Sorvala |
| 7,692,543 B2 | 4/2010 | Copeland |
| 7,710,325 B2 | 5/2010 | Cheng |
| 7,724,204 B2 | 5/2010 | Annamaa |
| 7,760,146 B2 | 7/2010 | Ollikainen |
| 7,764,245 B2 | 7/2010 | Loyet |
| 7,786,938 B2 | 8/2010 | Sorvala |
| 7,800,544 B2 | 9/2010 | Thornell-Pers |
| 7,830,327 B2 | 11/2010 | He |
| 7,843,397 B2 | 11/2010 | Boyle |
| 7,889,139 B2 | 2/2011 | Hobson et al. |
| 7,889,143 B2 | 2/2011 | Milosavljevic |
| 7,901,617 B2 | 3/2011 | Taylor |
| 7,903,035 B2 | 3/2011 | Mikkola et al. |
| 7,916,086 B2 | 3/2011 | Koskiniemi et al. |
| 7,963,347 B2 | 6/2011 | Pabon |
| 7,973,720 B2 | 7/2011 | Sorvala |
| 8,049,670 B2 | 11/2011 | Jung et al. |
| 8,054,232 B2 | 11/2011 | Chiang et al. |
| 8,098,202 B2 | 1/2012 | Annamaa et al. |
| 8,179,322 B2 | 5/2012 | Nissinen |
| 8,193,998 B2 | 6/2012 | Puente et al. |
| 8,378,892 B2 | 2/2013 | Sorvala |
| 8,466,756 B2 | 6/2013 | Milosavljevic et al. |
| 8,473,017 B2 | 6/2013 | Milosavljevic et al. |
| 8,564,485 B2 | 10/2013 | Milosavljevic et al. |
| 8,629,813 B2 | 1/2014 | Milosavljevic |
| 2001/0050636 A1 | 12/2001 | Weinberger |
| 2002/0183013 A1 | 12/2002 | Auckland et al. |
| 2002/0196192 A1 | 12/2002 | Nagumo et al. |
| 2003/0146873 A1 | 8/2003 | Blancho |
| 2004/0090378 A1 | 5/2004 | Dai et al. |
| 2004/0137950 A1 | 7/2004 | Bolin et al. |
| 2004/0145525 A1 | 7/2004 | Annabi et al. |
| 2004/0171403 A1 | 9/2004 | Mikkola |
| 2005/0055164 A1 | 3/2005 | Neff |
| 2005/0057401 A1 | 3/2005 | Yuanzhu |
| 2005/0159131 A1 | 7/2005 | Shibagaki et al. |
| 2005/0176481 A1 | 8/2005 | Jeong |
| 2006/0071857 A1 | 4/2006 | Pelzer |
| 2006/0192723 A1 | 8/2006 | Harada |
| 2007/0042615 A1 | 2/2007 | Liao |
| 2007/0082789 A1 | 4/2007 | Nissila |
| 2007/0152881 A1 | 7/2007 | Chan |
| 2007/0188388 A1 | 8/2007 | Feng |
| 2008/0059106 A1 | 3/2008 | Wight |
| 2008/0088511 A1 | 4/2008 | Sorvala |
| 2008/0266199 A1 | 10/2008 | Milosavljevic |
| 2009/0009415 A1 | 1/2009 | Tanska |
| 2009/0135066 A1 | 5/2009 | Raappana et al. |
| 2009/0153412 A1 | 6/2009 | Chiang et al. |
| 2009/0174604 A1 | 7/2009 | Keskitalo |
| 2009/0196160 A1 | 8/2009 | Crombach |
| 2009/0197654 A1 | 8/2009 | Teshima |
| 2009/0231213 A1 | 9/2009 | Ishimiya |
| 2010/0220016 A1 | 9/2010 | Nissinen |
| 2010/0244978 A1 | 9/2010 | Milosavljevic |
| 2010/0309092 A1 | 12/2010 | Lambacka |
| 2011/0128190 A1* | 6/2011 | Galeev .............. H01Q 1/243 343/702 |
| 2011/0133994 A1 | 6/2011 | Korva |
| 2011/0241950 A1* | 10/2011 | Milosavljevic ........ H01Q 1/52 343/702 |

(56) References Cited

U.S. PATENT DOCUMENTS

| | | | |
|---|---|---|---|
| 2012/0119955 A1 | 5/2012 | Milosavljevic et al. | |
| 2012/0280888 A1* | 11/2012 | Thiam | H01Q 9/0421 |
| | | | 343/893 |
| 2014/0320358 A1* | 10/2014 | Wong | H01Q 5/35 |
| | | | 343/749 |

FOREIGN PATENT DOCUMENTS

| | | |
|---|---|---|
| DE | 10150149 | 4/2003 |
| EP | 0 208 424 | 1/1987 |
| EP | 0 376 643 | 4/1990 |
| EP | 0 751 043 | 4/1997 |
| EP | 0 807 988 | 11/1997 |
| EP | 0 831 547 | 3/1998 |
| EP | 0 851 530 | 7/1998 |
| EP | 1 294 048 | 1/1999 |
| EP | 1 014 487 | 6/2000 |
| EP | 1 024 553 | 8/2000 |
| EP | 1 067 627 | 1/2001 |
| EP | 0 923 158 | 9/2002 |
| EP | 1 329 980 | 7/2003 |
| EP | 1 361 623 | 11/2003 |
| EP | 1 406 345 | 4/2004 |
| EP | 1 453 137 | 9/2004 |
| EP | 1 220 456 | 10/2004 |
| EP | 1 467 456 | 10/2004 |
| EP | 1 753 079 | 2/2007 |
| FI | 20020829 | 11/2003 |
| FI | 118782 | 3/2008 |
| FR | 2553284 | 10/1983 |
| FR | 2724274 | 3/1996 |
| FR | 2873247 | 1/2006 |
| GB | 2266997 | 11/1993 |
| GB | 2360422 | 9/2001 |
| GB | 2389246 | 12/2003 |
| JP | 59-202831 | 11/1984 |
| JP | 60-206304 | 10/1985 |
| JP | 61-245704 | 11/1986 |
| JP | 06-152463 | 5/1994 |
| JP | 07-131234 | 5/1995 |
| JP | 07-221536 | 8/1995 |
| JP | 07-249923 | 9/1995 |
| JP | 07-307612 | 11/1995 |
| JP | 08-216571 | 8/1996 |
| JP | 09-083242 | 3/1997 |
| JP | 09-260934 | 10/1997 |
| JP | 09-307344 | 11/1997 |
| JP | 10-028013 | 1/1998 |
| JP | 10-107671 | 4/1998 |
| JP | 10-173423 | 6/1998 |
| JP | 10-209733 | 8/1998 |
| JP | 10-224142 | 8/1998 |
| JP | 10-322124 | 12/1998 |
| JP | 10-327011 | 12/1998 |
| JP | 11-004113 | 1/1999 |
| JP | 11-004117 | 1/1999 |
| JP | 11-068456 | 3/1999 |
| JP | 11-127010 | 5/1999 |
| JP | 11-127014 | 5/1999 |
| JP | 11-136025 | 5/1999 |
| JP | 11-355033 | 12/1999 |
| JP | 2000-278028 | 10/2000 |
| JP | 2001-053543 | 2/2001 |
| JP | 2001-267833 | 9/2001 |
| JP | 2001-217631 | 10/2001 |
| JP | 2001-326513 | 11/2001 |
| JP | 2002-319811 | 10/2002 |
| JP | 2002-329541 | 11/2002 |
| JP | 2002-335117 | 11/2002 |
| JP | 2003-060417 | 2/2003 |
| JP | 2003-124730 | 4/2003 |
| JP | 2003-179426 | 6/2003 |
| JP | 2004-112028 | 4/2004 |
| JP | 2004-363859 | 12/2004 |
| JP | 2005-005985 | 1/2005 |
| JP | 2005-252661 | 9/2005 |
| KR | 20010080521 | 10/2001 |
| KR | 20020096016 | 12/2002 |
| SE | 511900 | 12/1999 |
| WO | WO 92/00635 | 1/1992 |
| WO | WO 96/27219 | 9/1996 |
| WO | WO 98/01919 | 1/1998 |
| WO | WO 99/30479 | 6/1999 |
| WO | WO 01/20718 | 3/2001 |
| WO | WO 01/29927 | 4/2001 |
| WO | WO 01/33665 | 5/2001 |
| WO | WO 01/61781 | 8/2001 |
| WO | WO 2004/017462 | 2/2004 |
| WO | WO 2004/057697 | 7/2004 |
| WO | WO 2004/100313 | 11/2004 |
| WO | WO 2004/112189 | 12/2004 |
| WO | WO 2005/062416 | 7/2005 |
| WO | WO 2007/012697 | 2/2007 |
| WO | WO 2010/122220 | 10/2010 |

OTHER PUBLICATIONS

"Dual Band Antenna for Hand Held Portable Telephones", Liu et al., Electronics Letters, vol. 32, No. 7, 1996, pp. 609-610.

"Improved Bandwidth of Microstrip Antennas using Parasitic Elements," IEE Proc. vol. 127, Pt. H. No. 4, Aug. 1980.

"A 13.56MHz RFID Device and Software for Mobile Systems", by H. Ryoson, et al., Micro Systems Network Co., 2004 IEEE, pp. 241-244.

"A Novel Approach of a Planar Multi-Band Hybrid Series Feed Network for Use in Antenna Systems Operating at Millimeter Wave Frequencies," by M.W. Elsallal and B.L. Hauck, Rockwell Collins, Inc., 2003 pp. 15-24, waelsall@rockwellcollins.com and blhauck@rockwellcollins.com.

Abedin, M. F. and M. Ali, "Modifying the ground plane and its erect on planar inverted-F antennas (PIFAs) for mobile handsets," *IEEE Antennas and Wireless Propagation Letters*, vol. 2, 226-229, 2003.

C. R. Rowell and R. D. Murch, "A compact PIFA suitable for dual frequency 900/1800-MHz operation," *IEEE Trans. Antennas Propag.*, vol. 46, No. 4, pp. 596-598, Apr. 1998.

Cheng-Nan Hu, Willey Chen, and Book Tai, "A Compact Multi-Band Antenna Design for Mobile Handsets", *APMC 2005 Proceedings*.

Endo, T., Y. Sunahara, S. Satoh and T. Katagi, "Resonant Frequency and Radiation Efficiency of Meander Line Antennas," Electronics and Commu-nications in Japan, Part 2, vol. 83, No. 1, 52-58, 2000.

European Office Action, May 30, 2005 issued during prosecution of EP 04 396 001.2-1248.

Examination Report dated May 3, 2006 issued by the EPO for European Patent Application No. 04 396 079.8.

F.R. Hsiao, et al. "A dual-band planar inverted-F patch antenna with a branch-line slit," *Microwave Opt. Technol. Lett.*, vol. 32, Feb. 20, 2002.

Griffin, Donald W. et al., "Electromagnetic Design Aspects of Packages for Monolithic Microwave Integrated Circuit-Based Arrays with Integrated Antenna Elements", IEEE Transactions on Antennas and Propagation, vol. 43, No. 9, pp. 927-931, Sep. 1995.

Guo, Y. X. and H. S. Tan, "New compact six-band internal antenna," *IEEE Antennas and Wireless Propagation Letters*, vol. 3, 295-297, 2004.

Guo, Y. X. and Y.W. Chia and Z. N. Chen, "Miniature built-in quadband antennas for mobile handsets", *IEEE Antennas Wireless Propag. Lett.*, vol. 2, pp. 30-32, 2004.

Hoon Park, et al. "Design of an Internal antenna with wide and multiband characteristics for a mobile handset", *IEEE Microw. & Opt. Tech. Lett.* vol. 48, No. 5, May 2006.

Hoon Park, et al. "Design of Planar Inverted-F Antenna With Very Wide Impedance Bandwidth", *IEEE Microw. & Wireless Comp., Lett.*, vol. 16, No. 3, pp. 113-115, Mar. 2006.

Hossa, R., A. Byndas, and M. E. Bialkowski, "Improvement of compact terminal antenna performance by incorporating open-end slots in ground plane," *IEEE Microwave and Wireless Components Letters*, vol. 14, 283-285, 2004.

(56) References Cited

OTHER PUBLICATIONS

I. Ang, Y. X. Guo, and Y. W. Chia, "Compact internal quad-band antenna for mobile phones" *Micro. Opt. Technol. Lett.*, vol. 38, No. 3 pp. 217-223 Aug. 2003.
International Preliminary Report on Patentability for International Application No. PCT/FI2004/000554, date of issuance of report May 1, 2006.
Jing, X., et al.; "Compact Planar Monopole Antenna for Multi-Band Mobile Phones"; Microwave Conference Proceedings, 4.-7.12.2005. APMC 2005, Asia-Pacific Conference Proceedings, vol. 4.
Kim, B. C., J. H. Yun, and H. D. Choi, "Small wideband PIFA for mobile phones at 1800 MHz," *IEEE International Conference on Vehicular Technology*, 27{29, Daejeon, South Korea, May 2004.
Kim, Kihong et at, "Integrated Dipole Antennas on Silicon Substrates for Intra-Chip Communication", IEEE, pp. 1582-1585, 1999.
Kivekas., O., J. Ollikainen, T. Lehtiniemi, and P. Vainikainen, "Bandwidth, SAR, and eciency of internal mobile phone antennas," *IEEE Transactions on Electromagnetic Compatibility*, vol. 46, 71{86, 2004.
K-L Wong, *Planar Antennas for Wireless Communications*, Hoboken, NJ: Willey, 2003, ch. 2.
Lindberg., P. and E. Ojefors, "A bandwidth enhancement technique for mobile handset antennas using wavetraps," *IEEE Transactions on Antennas and Propagation*, vol. 54, 2226{2232, 2006.
Marta Martinez-Vazquez, et al., "Integrated Planar Multiband Antennas for Personal Communication Handsets", *IEEE Trasactions on Antennas and propagation*, vol. 54, No. 2, Feb. 2006.
P. Ciais, et al., "Compact Internal Multiband Antennas for Mobile and WLAN Standards", *Electronic Letters*, vol. 40, No. 15, pp. 920-921, Jul. 2004.
P. Ciais, R. Staraj, G. Kossiavas, and C. Luxey, "Design of an internal quadband antenna for mobile phones", *IEEE Microwave Wireless Comp. Lett.*, vol. 14, No. 4, pp. 148-150, Apr. 2004.
P. Salonen, et al. "New slot configurations for dual-band planar inverted-F antenna," *Microwave Opt. Technol.*, vol. 28, pp. 293-298, 2001.
Papapolymerou, Ioannis et al., "Micromachined Patch Antennas", IEEE Transactions on Antennas and Propagation, vol. 46, No. 2, pp. 275-283, Feb. 1998.
Product of the Month, RFDesign, "GSM/GPRS Quad Band Power Amp Includes Antenna Switch,"1 page, reprinted Nov. 2004 issue of RF Design (www.rfdesign.com), Copyright 2004, Freescale Semiconductor, RFD-24-EK.
S. Tarvas, et al. "An internal dual-band mobile phone antenna," in *2000 IEEE Antennas Propagat. Soc. Int. Symp. Dig.*, pp. 266-269, Salt Lake City, UT, USA.
Wang, F., Z. Du, Q. Wang, and K. Gong, "Enhanced-bandwidth PIFA with T-shaped ground plane," *Electronics Letters*, vol. 40, 1504-1505, 2004.
Wang, H.; "Dual-Resonance Monopole Antenna with Tuning Stubs"; IEEE Proceedings, Microwaves, Antennas & Propagation, vol. 153, No. 4, Aug. 2006; pp. 395-399.
Wong, K., et al.; "A Low-Profile Planar Monopole Antenna for Multiband Operation of Mobile Handsets"; IEEE Transactions on Antennas and Propagation, Jan. 2003, vol. 51, No. 1.
X.-D. Cai and J.-Y. Li, Analysis of asymmetric TEM cell and its optimum design of electric field distribution, IEE Proc 136 (1989), 191-194.
X.-Q. Yang and K.-M. Huang, Study on the key problems of interaction between microwave and chemical reaction, Chin Jof Radio Sci 21 (2006), 802-809.
Chiu, C.-W., et al., "A Meandered Loop Antenna for LTE/WWAN Operations in a Smartphone," Progress in Electromagnetics Research C, vol. 16, pp. 147-160, 2010.
Lin, Sheng-Yu; Liu, Hsien-Wen; Weng, Chung-Hsun; and Yang, Chang-Fa, "A miniature Coupled loop Antenna to be Embedded in a Mobile Phone for Penta-band Applications," Progress in Electromagnetics Research Symposium Proceedings, Xi'an, China, Mar. 22-26, 2010, pp. 721-724.
Zhang, Y.Q., et al. "Band-Notched UWB Crossed Semi-Ring Monopole Antenna," Progress in Electronics Research C, vol. 19, 107-118, 2011, pp. 107-118.
Joshi, Ravi K., et al., "Broadband Concentric Rings Fractal Slot Antenna", XXVIIIth General Assembly of International Union of Radio Science (URSI). (Oct. 23-29, 2005), 4 Pgs.
Singh, Rajender, "Broadband Planar Monopole Antennas," M.Tech credit seminar report, Electronic Systems group, EE Dept, IIT Bombay, Nov. 2003, pp. 1-24.
Gobien, Andrew, T. "*Investigation of Low Profile Antenna Designs for Use in Hand-Held Radios*," Ch.3, *The Inverted-L Antenna and Variations*; Aug. 1997, pp. 42-76.
See, C.H., et al., "Design of Planar Metal-Plate Monopole Antenna for Third Generation Mobile Handsets," Telecommunications Research Centre, Bradford University, 2005, pp. 27-30.
Chen, Jin-Sen, et al., "CPW-fed Ring Slot Antenna with Small Ground Plane," Department of Electronic Engineering, Cheng Shiu University.
"LTE—an introduction," Ericsson White Paper, Jun. 2009, pp. 1-16.
"Spectrum Analysis for Future LTE Deployments," Motorola White Paper, 2007, pp. 1-8.
Chi, Yun-Wen, et al. "Quarter-Wavelength Printed Loop Antenna With an Internal Printed Matching Circuit for GSM/DCS/PCS/UMTS Operation in the Mobile Phone," IEEE Transactions on Antennas and Propagation, vol. 57, No. 9m Sep. 2009, pp. 2541-2547.
Wong, Kin-Lu, et al. "Planar Antennas for WLAN Applications," Dept. of Electrical Engineering, National Sun Yat-Sen University, Sep. 2002 Ansoft Workshop, pp. 1-45.
"λ/4 printed monopole antenna for 2.45GHz," Nordic Semiconductor, White Paper, 2005, pp. 1-6.
White, Carson, R., "Single- and Dual-Polarized Slot and Patch Antennas with Wide Tuning Ranges," The University of Michigan, 2008.
Extended European Search Report dated Jan. 30, 2013, issued by the EPO for EP Patent Application No. 12177740.3.

\* cited by examiner

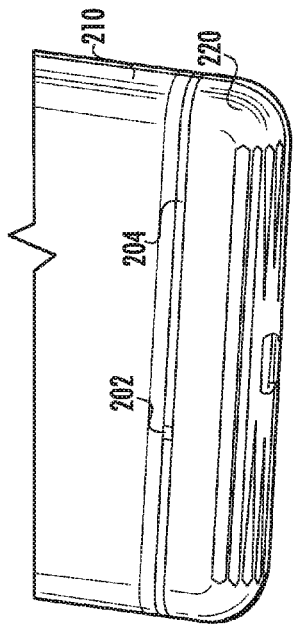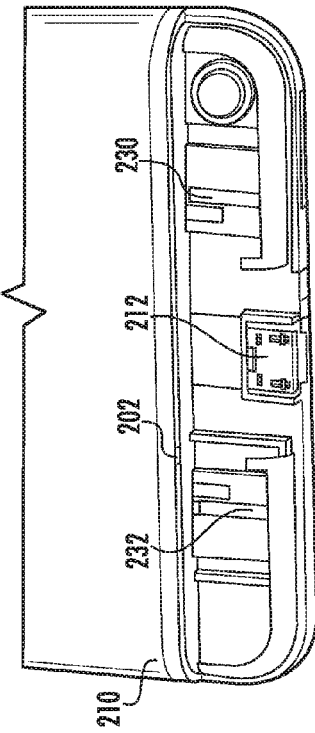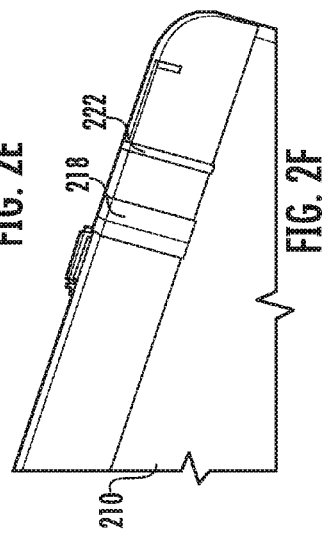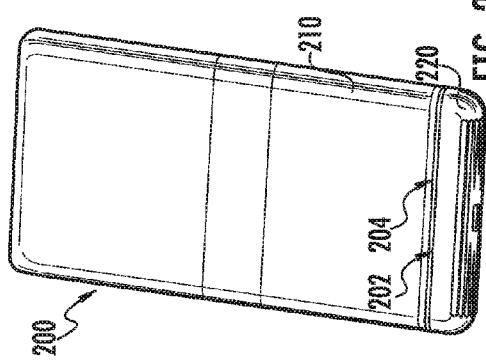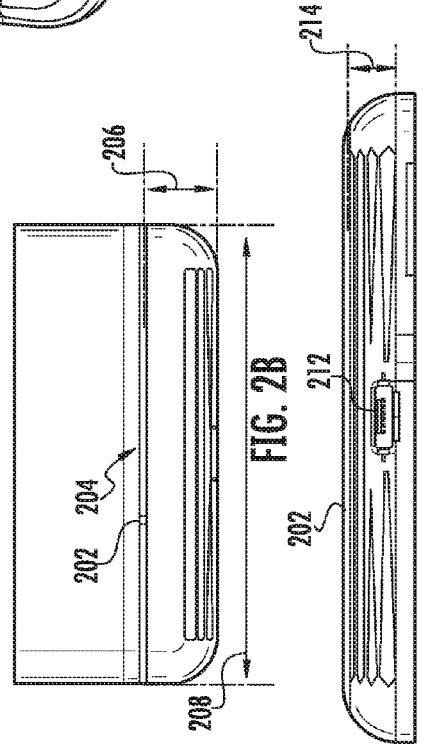

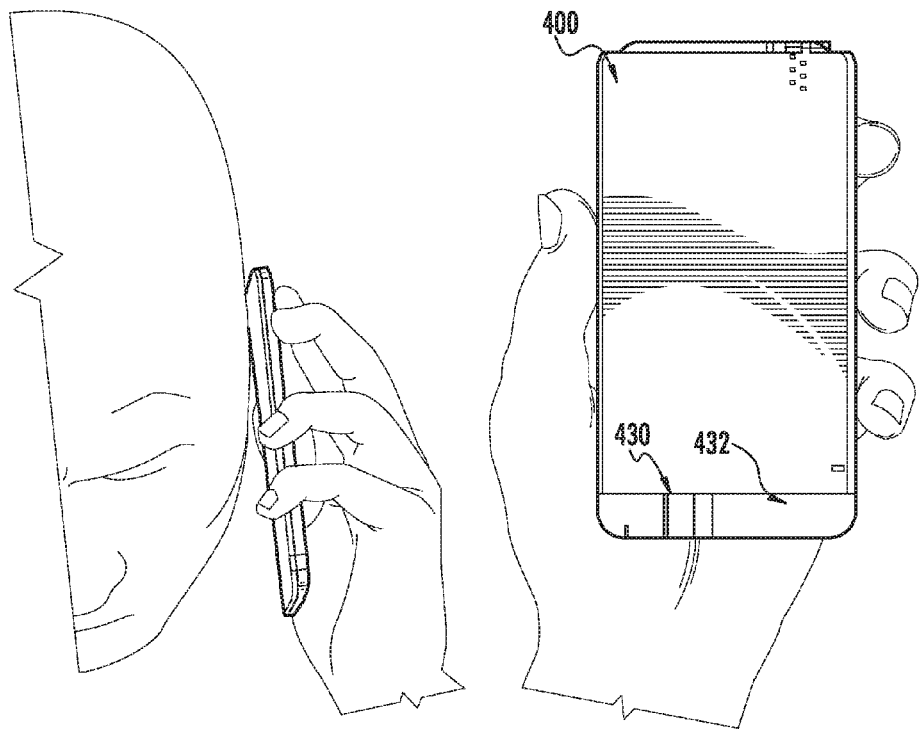
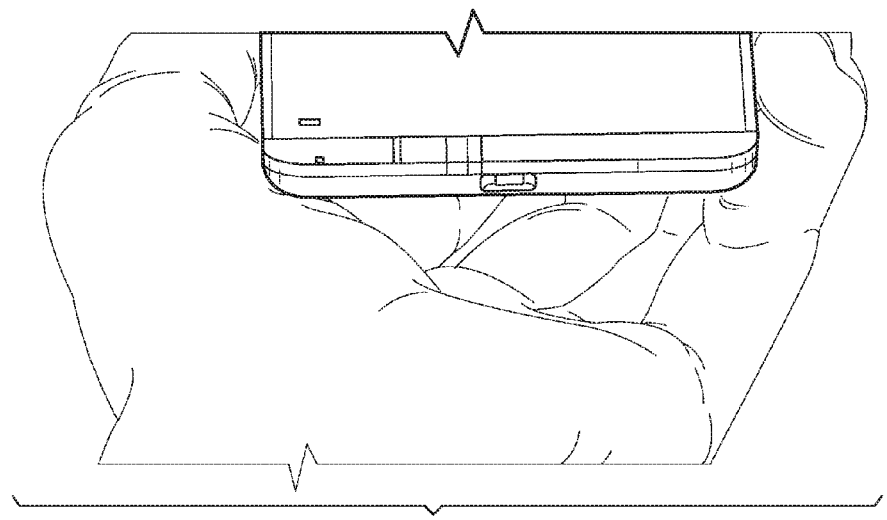
FIG. 6

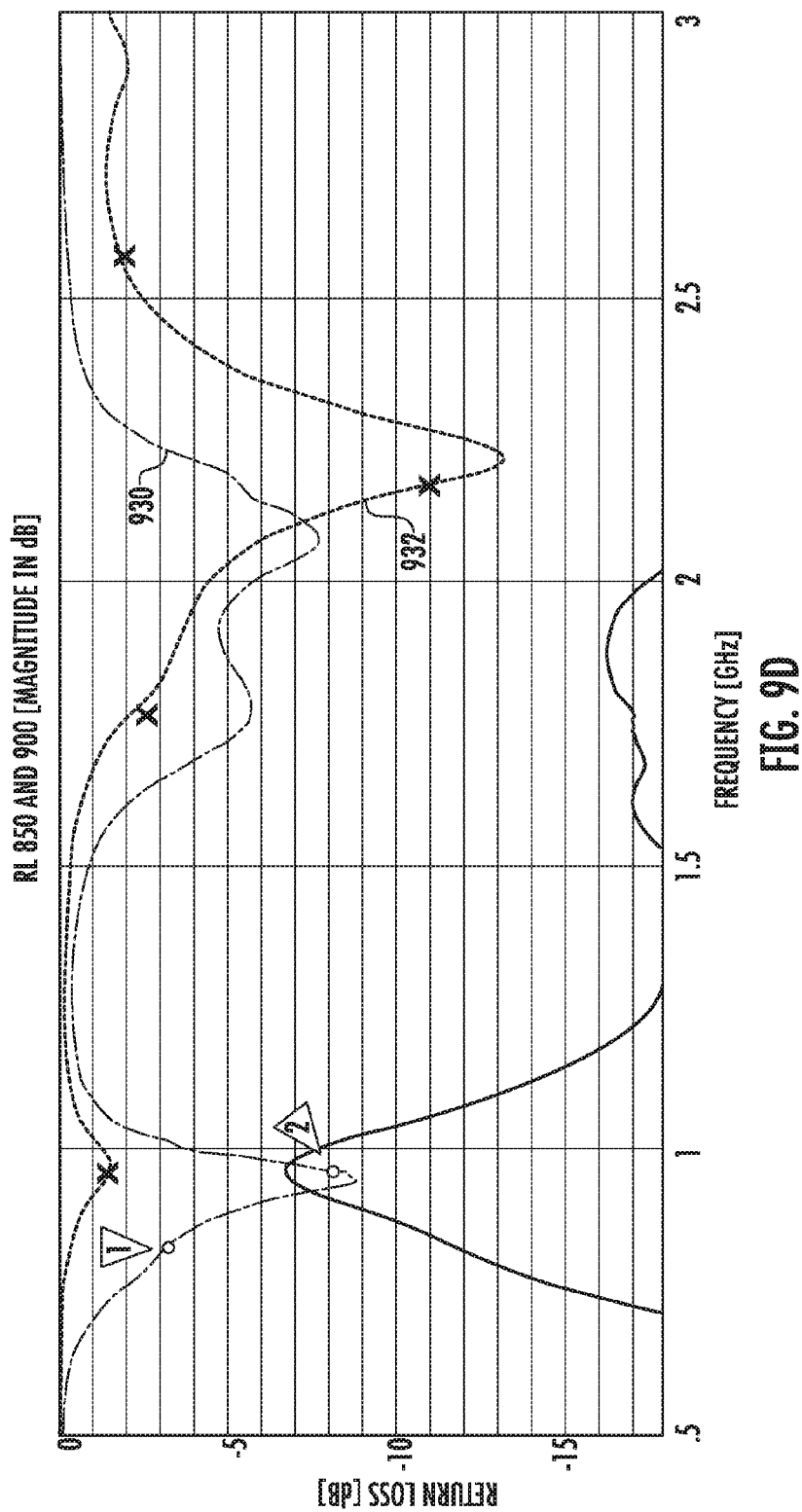

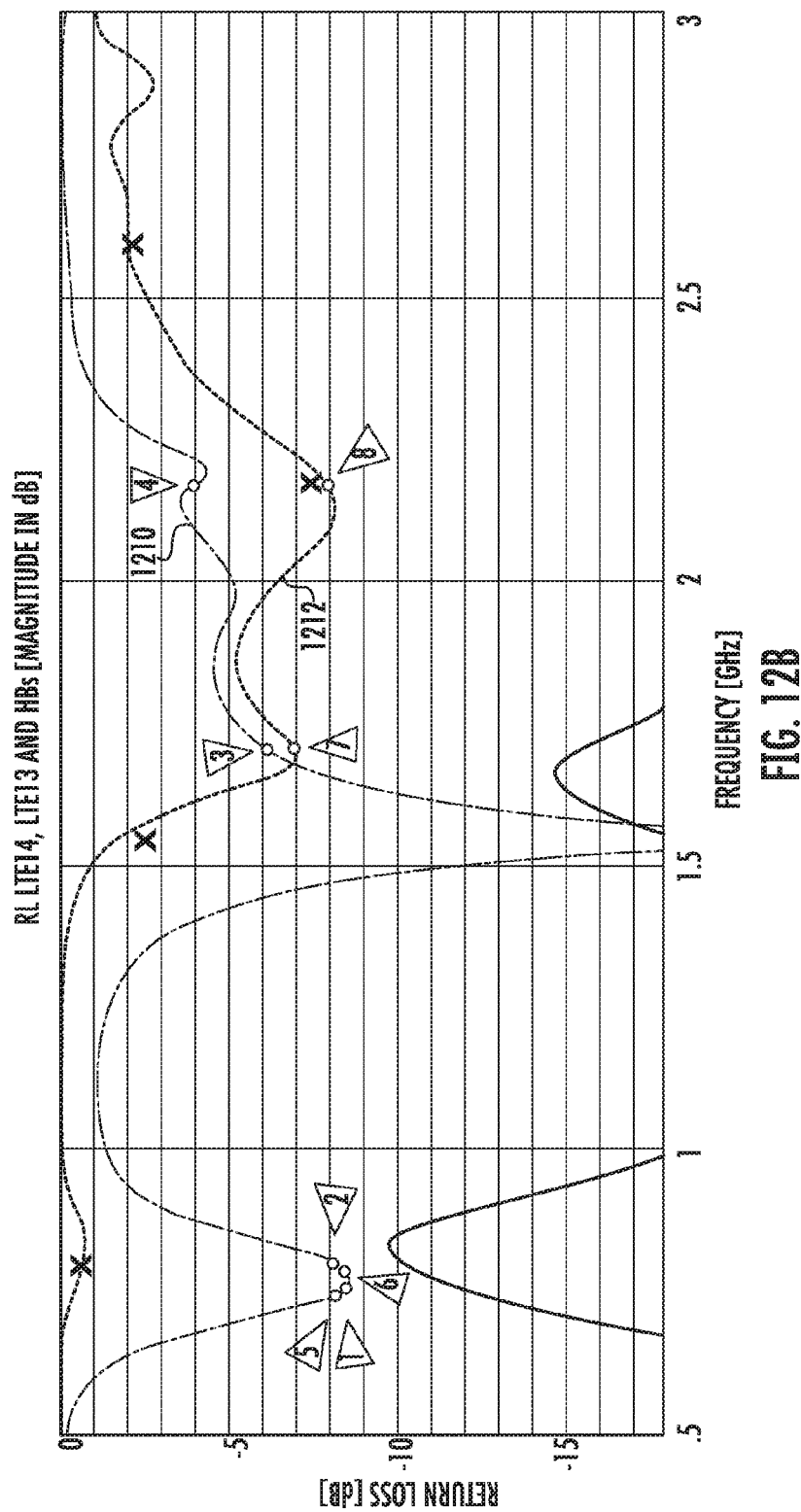

SWITCHABLE MULTI-RADIATOR HIGH BAND ANTENNA APPARATUS

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNOLOGICAL FIELD

The present disclosure relates generally to antenna apparatus for use in electronic devices such as for example wireless or portable radio devices, and more particularly in one exemplary aspect to a switchable multi-radiator high band antenna apparatus, and methods of producing, tuning and utilizing the same.

DESCRIPTION OF RELATED TECHNOLOGY

Internal antennas are an element found in most modern radio devices, such as mobile computers, mobile phones, Blackberry® devices, smartphones, tablet computers, personal digital assistants (PDAs), "smart" watches, or other personal communication devices (PCDs).

Typically, these antennas comprise one or more radiating elements disposed within the device enclosure. It is a common requirement that the antenna operate in more than one frequency band; e.g., both lower (such as for instance LTE12, LTE13, LTE17, LTE14, LTE20, GSM850, E-GSM900) and an upper band (such as DCS1800, PCS1900, WCDMA-1) frequencies.

Portable mobile devices often comprise enclosures that are, at least partly, fabricated from an electrically conductive material (e.g., metals or alloys). During handheld operation of the mobile device by a user, the antenna operating at upper band frequencies may be detuned due to interference from the user's hand and/or head. The antenna detuning may lead to reduced performance of the communication device, e.g., reduced range, reduced data rate, increased directionality, and/or link drop.

Accordingly, there is a salient need for an improved internal antenna apparatus capable of supporting operation at the lower and the upper frequencies while operating inside a metal enclosure that may be placed in a user's hand and/or near their head.

SUMMARY

The present disclosure satisfies the foregoing needs by providing, inter alia, improved multiband antenna apparatus and methods useful in, e.g., mobile wireless devices.

In a first aspect, a multiband antenna apparatus is disclosed. In one embodiment, the apparatus is for use in a radio communications device, and includes: a radiator structure disposed to substantially envelop one lateral end of the device, and configured to be electrically connected to a ground plane of the device; a first and a second feed structure configured to be selectively connected to a radio frequency feed port; and a ground structure, configured to be electrically connected to the ground plane.

In one variant, the first feed structure is configured to effectuate radio frequency communications within at least one upper frequency band and at least one lower frequency band; and the second feed structure is configured to effectuate radio frequency communications within the at least one upper frequency band.

In another variant, the apparatus further includes a selector apparatus configured to selectively electrically connect one of (i) the first feed structure, or (ii) the second feed structure, to the feed port.

In another variant, the ground plane is connected via first and second ground elements, the second ground element configured to be connected to the ground plane via a switching circuit comprising two or more alternate electrical signal paths each comprising a reactive circuit characterized by a respective impedance value that enables selective tuning of an operational band of the radiator structure.

In a further variant, the first ground element comprises a static ground element characterized by a single connection state; the first feed structure comprises a first matching circuit configured to be coupled to the feed port, and to tune the antenna operation to the at least one upper frequency band; and the second feed structure comprises a second matching circuit configured to be coupled to the feed port, and to tune the antenna operation to the at least one upper frequency band.

In another aspect of the disclosure, a method of mitigating effects of user interference on a radio signal emitting and receiving mobile device is disclosed. In one embodiment, the mobile device is characterized by first and second user grasping locations, and the method includes: energizing a first antenna feed structure with a radio signal comprising at least a first frequency component, the first antenna feed structure being encompassed by a radiating element disposed proximate one end of the device; and determining a performance measure associated with a received signal at the first frequency by the radiating element. In one variant, the method further includes, based at least on the performance measure not meeting one or more prescribed criteria: de-energizing the first antenna feed structure; and energizing a second antenna feed structure with a radio signal comprising at the least first frequency component; the second antenna feed structure being encompassed by the radiating element.

In another variant, the first grasping location corresponds to a user's hand covering at least partly the radiating element proximate the antenna feed structure; and the energizing the second antenna feed structure and de-energizing the first antenna feed structure cooperate to effectuate the mitigation of the user interference.

In a further variant, the determining the performance measure comprises: causing radiation of a first signal magnitude via the first feed structure; and evaluating a threshold and a second signal magnitude received via the first feed structure.

In another aspect, a multi-band antenna apparatus is disclosed. In one embodiment, the apparatus includes: a first radiating element in communication with a first feed structure; a second radiating element in communication with a second feed structure; and logic, in operative communication with the first and second feed structures, to selectively cause feeding of one of the first and second radiating elements based on detection of a reduction in performance of the other of the first and second radiating elements due to proximity to part of a user's anatomy.

In a further aspect, a mobile radio frequency communication device is disclosed. In one embodiment, the device includes: an enclosure and an electronics assembly contained substantially therein, said electronics assembly comprising a ground plane and a first and a second feed port; and a multi-band antenna apparatus. In one variant, the antenna apparatus includes: a metal cup structure disposed proximate one end of the enclosure and configured to be electrically connected to the ground plane via a first and a second ground element; a first and a second feed structure; a ground structure configured to be electrically connected to the ground plane; and a selector apparatus configured to selectively electrically connect one of (i) the first feed structure to the first feed port or (ii) the second feed structure to the second feed port.

In another variant, the first feed structure is configured to effectuate the radio frequency communications within at least one high frequency band and at least one low frequency band; the second feed structure is configured to effectuate the radio frequency communications within the at least one high frequency band; the enclosure comprises a chassis and the cup, the cup being electrically separated from the chassis by a non-conductive slot thereby forming an operational antenna portion, the operational portion configured to form a first electromagnetic resonance in at least a second high frequency band; the second ground element is configured to be connected to the ground plane via a switching circuit comprising two or more alternate electrical signal paths; and the metal cup structure is configured to form a second electromagnetic resonance in at least a fourth and a third frequency bands.

In another aspect of the disclosure, a method of tuning the antenna apparatus is disclosed.

In yet a further aspect, a method of operating the antenna apparatus is disclosed.

In yet another aspect, a tuning circuit is disclosed. In one embodiment, the tuning circuit is configured for use with a multi-band antenna in a mobile wireless device.

Further features of the present disclosure, its nature and various advantages will be more apparent from the accompanying drawings and the following detailed description.

BRIEF DESCRIPTION OF THE DRAWINGS

The features, objectives, and advantages of the disclosure will become more apparent from the detailed description set forth below when taken in conjunction with the drawings, wherein:

FIG. 2A is a perspective view of the backside of a mobile communications device comprising the switched dual radiator antenna apparatus, in accordance with one exemplary implementation.

FIG. 2B is a detailed view of an exemplary metal cup radiator element for use with the mobile communications device of FIG. 2A.

FIG. 2C is a bottom view of the exemplary metal cup radiator element shown in FIG. 2B.

FIG. 2D is a detailed perspective view of the exemplary metal cup radiator element shown in FIGS. 2B and 2C.

FIG. 2E is a detailed perspective view of an exemplary feed configuration for the switched dual radiator antenna apparatus of FIG. 2A.

FIG. 2F is a detailed perspective view of an exemplary ground configuration for the switched dual radiator antenna apparatus of FIG. 2A.

FIG. 6 is a graphical illustration depicting operational placement of the mobile communications device of, e.g., FIG. 2A in the user left hand and near the head, in accordance with one implementation.

FIG. 9D depicts free-space return loss (in dB) as a function of frequency for exemplary GSM 850 and GSM 900 bands, obtained using the exemplary antenna apparatus of FIG. 1.

FIG. 12B depicts loss (in dB) as a function of frequency for the LTE 14, LTE 13, DCS 1800, PCS 1900 and WCDMA1 operating bands, obtained using the mobile device configuration shown in FIG. 6; i.e., head with hand, left cheek (BHHL).

Figure 1:
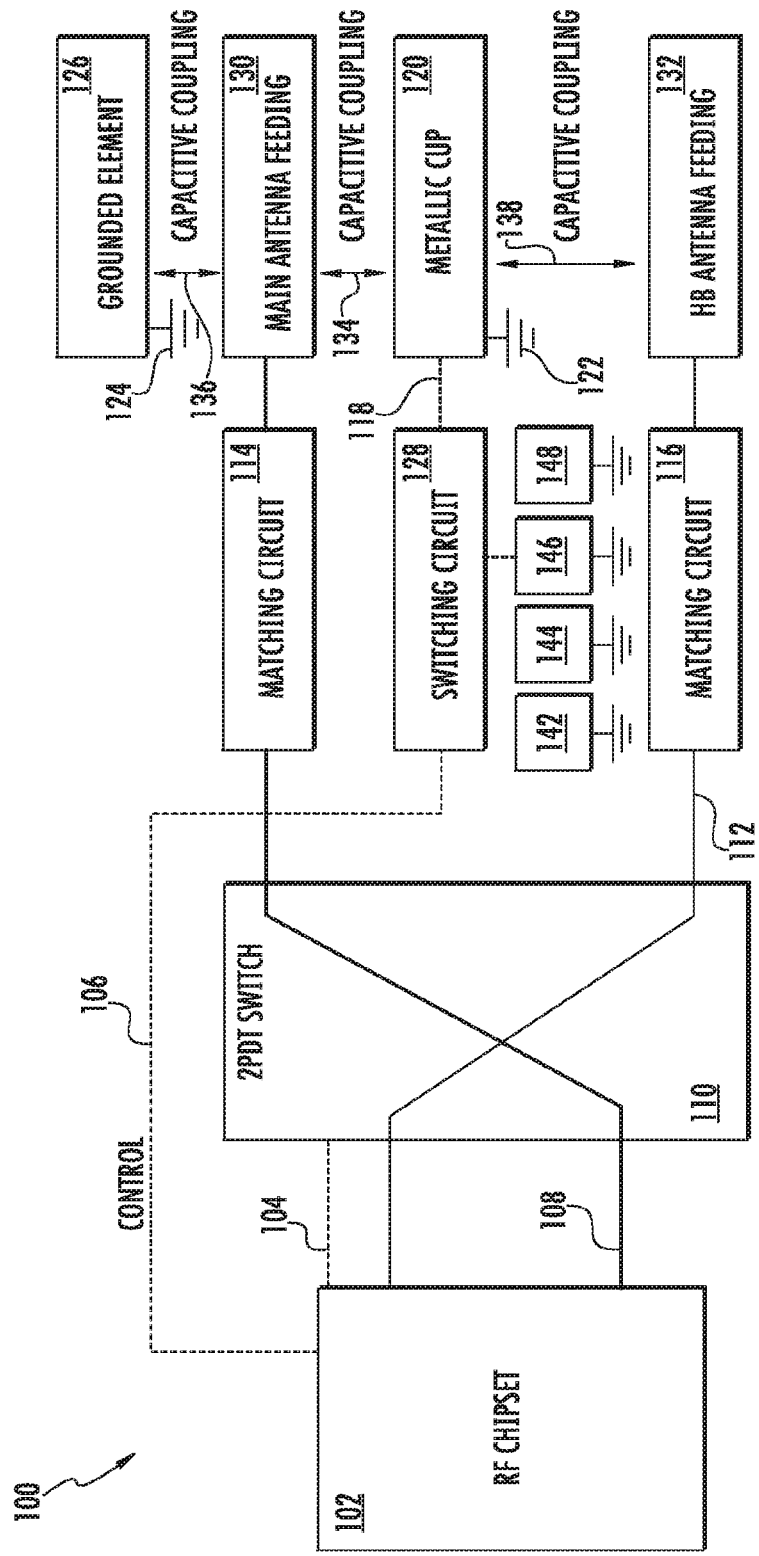
FIG. 1 is a functional block diagram illustrating a switched dual radiator antenna apparatus, in accordance with one exemplary implementation of the present disclosure.

All Figures disclosed herein are © Copyright 2013 Pulse Finland Oy. All rights reserved.

DETAILED DESCRIPTION

Reference is now made to the drawings wherein like numerals refer to like parts throughout.

As used herein, the terms "antenna," "antenna element", and "antenna system," refer without limitation to any apparatus that incorporates a single element, multiple elements, or one or more arrays of elements that receive/transmit and/or propagate one or more frequency bands of electromagnetic radiation. The radiation may be of numerous types, e.g., microwave, millimeter wave, radio frequency, digital modulated, analog, analog/digital encoded, digitally encoded millimeter wave energy, or the like. The energy may be transmitted from location to another location, using, one or more repeater links, and one or more locations may be mobile, stationary, or fixed to a location on earth such as a base station.

As used herein, the terms "board" and "substrate" refer generally and without limitation to any substantially planar or curved surface or component upon which other material and/or components can be disposed. For example, a substrate may comprise a single or multi-layered printed circuit board (e.g., FR4), a semi-conductive die or wafer, or even a surface of a housing or other device component, and may be substantially rigid or alternatively at least somewhat flexible.

As used herein, the terms "frequency range", "frequency band", and "frequency domain" refer without limitation to any frequency range for communicating signals. Such signals may be communicated pursuant to one or more standards or wireless air interfaces.

As used herein, the terms "portable device", "mobile device", "client device", "portable wireless device", and "host device" include, but are not limited to, personal computers (PCs) and minicomputers, whether desktop, laptop, or otherwise, set-top boxes, personal digital assistants (PDAs), handheld computers, tablets, "smart" watches, personal communicators, tablet computers, portable navigation aids, J2ME equipped devices, cellular telephones, smartphones, personal integrated communication or entertainment devices, or literally any other device capable of interchanging data with a network or another device.

As used herein, the terms "radiator," and "radiating element" refer without limitation to an element that can function as part of a system that receives and/or transmits radio-frequency electromagnetic radiation; e.g., an antenna.

As used herein, the terms "RF feed", "feed" and "feed conductor" refer without limitation to any energy conductor and coupling element(s) that can transfer energy, transform impedance, enhance performance characteristics, and conform impedance properties between incoming/outgoing RF energy signals to that of one or more connective elements, such as for example a radiator.

As used herein, the terms "top", "bottom", "side", "up", "down", "left", "right", "back", "front", and the like merely connote a relative position or geometry of one component to another, and in no way connote an absolute frame of reference or any required orientation. For example, a "top" portion of a component may actually reside below a "bottom" portion when the component is mounted to another device (e.g., to the underside of a PCB).

As used herein, the term "wireless" means any wireless signal, data, communication, or other interface including without limitation Wi-Fi, Bluetooth, 3G (e.g., 3GPP, 3GPP2, and UMTS), HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, Long Term Evolution (LTE) or LTE-Advanced (LTE-A), analog cellular, NFC/RFID, CDPD, satellite systems such as GPS, millimeter wave or microwave systems, optical, acoustic, and infrared (i.e., IrDA).

Overview

The present disclosure provides, inter alia, a switchable multi-radiator high-band antenna apparatus, and methods of tuning and utilizing the same. An exemplary embodiment of the antenna apparatus may be configured to operate in dual (i.e., lower and upper) frequency bands, so as to facilitate use within a handheld mobile communications device (e.g., cellular telephone or smartphone). The mobile communications device may comprise at least partly, a metal enclosure configured to house the antenna and the radio frequency (RF) electronics "engine" (e.g., transceiver). The antenna apparatus in one embodiment includes a metal cup, two feeding structures, a switching element, and a ground element. One feeding structure may be used to tune the antenna in both the lower (e.g., GSM850, E-GSM900, LTE12, LTE 17, and/or other) and the upper band frequencies (e.g., DCS1800, WCDMA1, LTE7, and/or other). The other feed structure may be used to tune the antenna in the upper band. Frequency tuning of the antenna feed structures may be effectuated via respective impedance matching circuits. The switching element is in one variant configured to direct signal routing from the RF engine to one of the two feed structures (such as e.g., 700 MHz to 2170 MHz via the main feed, and 1710-2170 MHz for the alternate or high-band (HB) feed).

During device operation, a user's hand may cover one of the antenna elements (e.g., radiators that are proximate the first feeding structure). Responsive to a determination by the device electronics of reduced performance associated with the partially covered antenna element, the RF engine may direct the switching element to alter the feed signal route to the second feed structure. The automatic switching of the antenna active radiator advantageously mitigates antenna detuning due to proximity to the user's body (e.g., hand, and/or head) thereby user improving robustness of the mobile device communications and enhancing user experience.

DETAILED DESCRIPTION OF EXEMPLARY EMBODIMENTS

Detailed descriptions of the various embodiments and variants of the apparatus and methods of the disclosure are now provided. While primarily discussed in the context of mobile devices, the various apparatus and methodologies discussed herein are not so limited. In fact, many of the apparatus and methodologies described herein are useful in any number of other antenna applications, whether associated with mobile or fixed devices, cellular or otherwise.

Moreover, while primarily described in the exemplary context of a dual (two) radiator apparatus, the various principles of the disclosure can be readily extended and applied to implementations having three or more radiators. e.g., tri-band, quad-band, etc.

Exemplary Antenna Element Apparatus and Methods

Referring now to FIGS. 1 through 2, exemplary embodiments of the switched multi-radiator radio antenna apparatus of the disclosure are described in detail. One exemplary implementation of the switched antenna apparatus for use in a mobile radio device is presented in FIG. 1. As shown, the antenna apparatus 100 comprises an element 120, first 130 and second 132 feeding structures (e.g., main and high band (HB) feed structures), and first and second ground elements 122, 126 (see e.g., elements 218 and 222, respectively, in FIG. 2F herein).

The first feed structure 130 (also referred to as the main feed structure in this embodiment) may be utilized to tune the antenna 100 in both lower and upper band frequencies, and the second feed structure 132 only to high band. Impedance matching in this embodiment is made with matching circuits. Frequency tuning of the antenna feed structures 130, 132 may be effectuated via impedance matching circuits 114, 116, respectively. One exemplary embodiment of the matching circuits 114, 116 is shown and described with respect to FIG. 3, below. Individual ones of the feed structures 130, 132 are configured to cause an electromagnetic resonance in at least one band, e.g., W-CDMA 1. For example, the resonance from the exemplary feed structures 130 and 132 can be seen in high band frequencies in the vicinity of 2000 MHz (PCS1900 and WCDMA1), with the same band for both feeds. In one variant, the main antenna feeding uses all the possible frequencies from 700 MHz to 2170 MHz, while the HB antenna feed is used as an alternative signal path for frequencies from 1710-2170 MHz (such as when the main antenna is covered by the user's hand in the upper frequencies).

The lower and/or the upper frequency bands may comprise one or more individual bands configured to support one or more communications standards (e.g., Global System for Mobile Communications (GSM), Long Term Evolution (LTE), Wideband Code Division Multiple Access (W-CDMA), Code Division Multiple Access (CDMA), and/or other standards. In some implementations, the lower frequency band includes one or more of the following: LTE 12 (698-746 MHz), LTE 17 (704 MHz to 746 MHz), LTE 13 (746 MHz to 787 MHz), LTE 14 (758 MHz to 798 MHz), LTE 20 (791 to 862 MHz), GSM850 (824 MHz to 894 MHz), E-GSM-900 (880 MHz to 960), and/or other bands, and the upper frequency band includes one or more of the following: DCS1800 (1710 MHz to 1880 MHz), PCS1900 (1850 MHz to 1990 MHz), WCDMA1 (1920 MHz to 2170 MHz), LTE 7 (2500 MHz to 2690 MHz) and/or other bands. Various other combinations or permutations of the foregoing (and in fact others) will be recognized by those of ordinary skill given the present disclosure.

The element 120 may comprise a metal structure and/or plastic structure with one or more metallic (conductive) layers. In some implementations, e.g., such as those illustrated and described with respect to FIGS. 2A-2B, the element 120 includes a metallic "cup" forming a portion of the mobile device enclosure and configured to cover one lateral (e.g., the bottom) end of the mobile device. The element 120 can be capacitively coupled to the feed structures 130, 132. The electromagnetic coupling 134, 138 of the element 120 is in the illustrated embodiment configured to cause at least two resonances, thereby effectuating radio communications in the respective frequency bands, e.g., LTE12/LTE17 lower bands, LTE 13/LTE14 upper bands, GSM 850/GSM 900 lower bands and/or other bands.

The element 120 may be isolated from the device metal enclosure and/or chassis (e.g., 210 in FIG. 2A) by a slot (e.g., 204 in FIG. 2A) or other approach. The slot 204 is in the illustrated embodiment configured to cause at least one upper band resonance, thereby effectuating radio communications in the respective frequency band, e.g., DCS1800/PCS1900, and/or other bands.

The exemplary mobile device further includes a ground plane, e.g., disposed on a printed circuit board of the device. The cup element 120 is coupled to the ground plane via first 118 and second ground 122 structures. The ground structure 122 may comprise a solid or fixed ground characterized by a single connection state (e.g., always connected to ground via the same circuit). In some implementations, e.g., as shown in FIG. 2F, the solid ground structure 122 comprises a metal strip 218. The position of the solid ground 218 may be used to select the antenna resonant frequency, and the width of the solid ground used to select the bandwidth of the antenna. In the illustrated embodiment, a switched ground 202 (see FIGS. 2A-2E) is provided, and the structure 222 is tuned for WCDMA1-Rx (but can also be used to cover other frequencies, such as e.g., LTE7 frequencies).

The exemplary ground structure 118 includes a switched ground characterized by two or more connection states. In some implementations, e.g., such as shown in FIG. 1, the switched ground structure 118 may comprise a switching circuit 128 configured to couple the element 120 to ground via one of four circuits 142, 144, 146, 148. The individual circuits 142, 144, 146, 148 are in one variant characterized by respective impedances configured to tune the element 120 to a given operating frequency band (e.g., LTE 12, LTE 17, LTE 13, LTE14, GSM850, GSM900, LTE 20, and/or other). The switching element 128 may comprise for instance a single pole four throw switch (SP4T) controlled by the RF engine of the antenna apparatus (e.g., the RF chipset 102). The SP4T switch 128 may be used to present different impedance values from antenna to ground. It will be appreciated by those skilled in the art given the present disclosure that the foregoing switching configuration (e.g., the switch type, number of input and/or output contacts, and/or frequency band composition) is exemplary, and various other switched ground implementations may be utilized consistent with the antenna application specifications.

The ground element 126 is in the exemplary embodiment configured to capacitively (electromagnetically) couple to the main feed structure 130 (shown by the arrow 136 in FIG. 1), and/or the high band (HB) feed structure 132. The ground element 126 may be tuned to comprise a parasitic element (e.g., passive radiator) at one or more upper band frequencies. In the antenna embodiment described with respect to FIGS. 1, 2A-2F, the parasitic resonance is tuned to WCDMA1-Rx frequencies.

The antenna apparatus 100 further comprises a switch 110 which in some implementations, is embodied as a two pole dual throw (DPDT) switch configured to be controlled by the RF engine 102 via a control line 104. The RF engine may direct the switching element 110 to alter the feed signal path from the path 112 to the signal path 108 as described in greater detail below.

FIGS. 2A through 2F depict an exemplary mobile communications device comprising the switched dual radiator antenna apparatus (e.g., the apparatus 100 described with respect to FIG. 1, supra).

The exemplary mobile communications device 200 of FIG. 2A includes a metal or partly metallic enclosure and/or chassis 210. The antenna apparatus includes a metallic element 220 (e.g., 120 in FIG. 1A). The apparatus element 220 is isolated from the enclosure 210 by e.g., a slot 204 or other mechanism. One resonance (in the upper frequency band frequencies) may be excited from the slot 204. In the implementation illustrated in FIGS. 2A-2B, 2D, the slot width has been selected at 1 mm, thereby causing an upper band resonance at frequency bands associated with the exemplary DCS1800/PCS1900 standards. It will be appreciated by those skilled in the art that the foregoing slot configuration may be adjusted in accordance with the antenna specification (e.g., the slot width may be selected between e.g., 0.1 mm and 5 mm) in order to tune the antenna as desired or required by a given application.

The location denoted by arrow 202 in FIGS. 2A-2D denotes the switched ground location of the antenna apparatus (e.g., 118 in FIG. 1).

FIGS. 2B-2C illustrate dimensions and configuration of the exemplary metal cup radiator element 220. The width 208 and height 214 of the element 220 are in this implementation configured at 69.8 mm and 5 mm, respectively, e.g., commensurate with the device 200 enclosure 210 dimensions, although it will be appreciated that these values (and this radiator/enclosure relationship) are not a requirement. The element 220 depth 206 in the illustrated implementation is configured at 11 mm, although other values may be used as well. The cup element 220 includes in this implementation an opening configured to accept a power and/or communications connector 212 (e.g., a micro USB connector).

FIG. 2E illustrates an exemplary feed configuration of a switched dual radiator antenna disposed in the portable communications device. The cup element 220 is not shown in the isometric view depicted in FIG. 2E for clarity. The illustrated structures 230, 232 correspond to the main and the high-band (HB) antenna feed structures (e.g., the structures 130, 132 described with respect to FIG. 1 above). The structures 230, 232 comprise metal strips of about 1.4 mm in width and 10.6 mm in length, although other values may be readily substituted. The feed structures 230, 232 may be spaced from one another by about 32 mm in the exemplary embodiment. It is noted that the antenna feeding point is typically placed at a location corresponding to about one-third (⅓) of the device total width. In the illustrated implementation, the middle point of the feed structure is 16.9 mm from the device edge, which is about one-fourth (¼) of the device width, although other placements and positions are readily employed consistent with the present disclosure, the foregoing being merely exemplary.

FIG. 2F illustrates an exemplary ground configuration of a switched dual radiator antenna disposed in the portable communications device. The cup element 220 is not shown in the isometric view depicted in FIG. 2F for clarity. The elements 218, 222 are used for various functions. Specifically, in the exemplary embodiment, the position of the element 218 may be used to select the antenna resonant frequency, while the width of the element 218 may be used to select the bandwidth of the antenna (in the low band). Additionally, the solid ground 222 behaves as a parasitic resonator tuned to e.g., WCDMA1-Rx frequencies.

Figure 3:
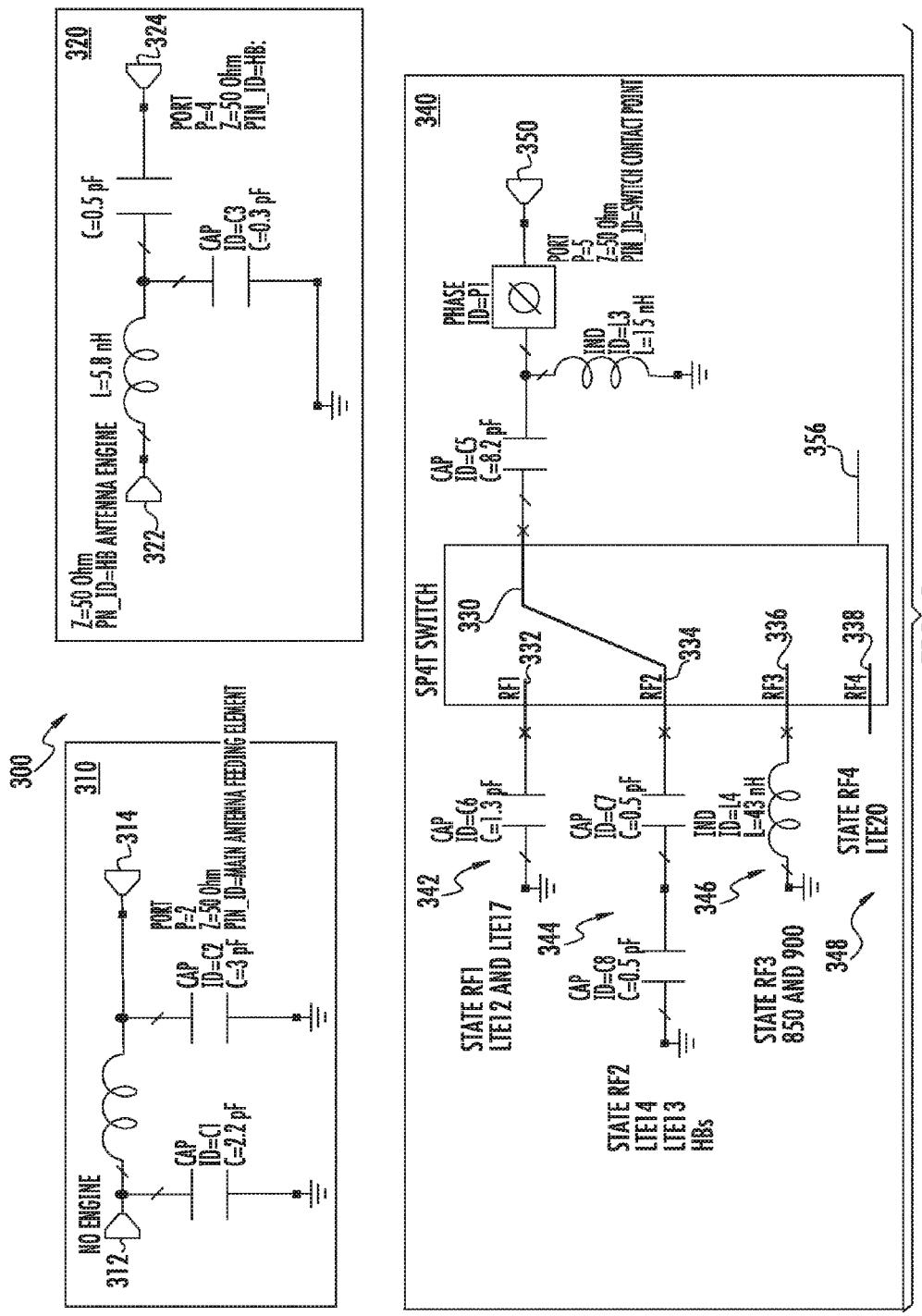
FIG. 3 is an electrical schematic diagram illustrating tuning of the switched dual radiator antenna apparatus (e.g., of FIG. 1), in accordance with one implementation.

FIG. 3 illustrates an exemplary implementation of a tuning circuit for the switched multi-radiator antenna apparatus (e.g., the dual radiator apparatus of FIG. 1). The illustrated circuit 300 includes tuning circuits 310, 320 configured to tune the main and the HB antenna feed structures (e.g., 130, 132 in FIG. 1), respectively. The circuit 310 also includes a reactive circuit configured to adjust the impedance of a signal path between the RF engine (e.g., the block 102 in FIG. 1) main antenna feed port 312 and the antenna main antenna feed port 314. The circuit 320 in this implementation includes a reactive circuit configured to adjust impedance of a signal path between the RF engine HB antenna feed port 322 and the antenna HB antenna feed port 324.

The exemplary circuit 300 comprises a switched ground block 340 configured to selectively couple the element 120 in FIG. 1 to the ground plane. The block 340 in one embodiment includes a single pole four throw switch 330 controlled by the RF engine of the antenna apparatus (e.g., the RF chipset 102) via control line 356. The switch 330 is characterized by four states 332, 334, 336, 338 that may be used to present different impedance values from the antenna port 350 to ground. The block 340 may also comprise two or more reactive circuits 342, 344, 346, 348 configured to adjust impedance of a signal path between the antenna port 350 and ground.

Figures 4A, 4B:
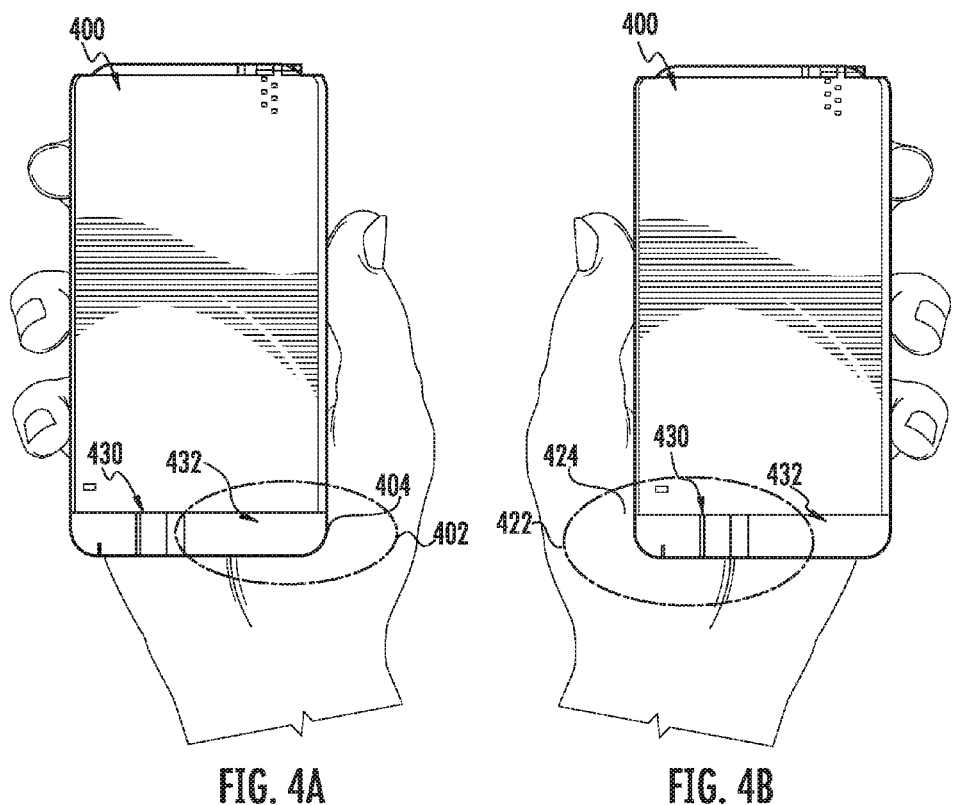
FIG. 4A is a graphical illustration depicting operational placement of the mobile communications device of, e.g., FIG. 2A, in the user right hand, in accordance with one implementation.
FIG. 4B is a graphical illustration depicting operational placement of the mobile communications device of, e.g., FIG. 2A in the user left hand, in accordance with one implementation.

FIG. 4A illustrates an exemplary operational placement of a mobile communications device (e.g., the device 200 of FIG. 2A), in the user's right hand. When the device 400 is placed in the user's right hand (e.g., in order to press an answer button during a call, access a touch and/or perform other actions), the antenna radiator portion 402 proximate to the HB feed structure 432 (e.g., the structure 132 in FIG. 1 and/or the structure 232 in FIG. 2E) may become, at least partly, blocked by the hand 404. This HB feed structure blocking may cause detuning of the antenna in one or more upper frequency bands. The antenna detuning may cause, inter alia, an increase signal return loss and/or a reduction in total antenna efficiency when communicating using the one or more upper frequency band. The device processing electronics is configured in the exemplary implementation to detect the reduced antenna performance, and switch over the communication signal path from the HB feed structure 432 to the main antenna feed structure 430. This signal path adjustment corresponds to the RF engine 102 directing the switching element 110 over the control line 104 to switch feed signal from the signal path 112 to the signal path 108, shown in FIG. 1.

FIG. 4B illustrates an exemplary operational placement of a mobile communications device (e.g., the device 200 of FIG. 2A), in the user's left hand. When the device 400 is placed in the user's left hand (e.g., in order to press an answer button during a call, access a touch and/or perform other actions), the antenna radiator portion 422 proximate to the main feed structure 430 (e.g., the structure 130 in FIG. 1 and/or the structure 230 in FIG. 2E) may become, at least partly, blocked by the user hand 424 (in contrast to the right-handed grasp of FIG. 4A, wherein the HB structure is partly blocked). The main feed structure blocking may cause, inter alia, detuning of the antenna in one or more upper frequency bands. The antenna detuning may cause an increase signal return loss and/or a reduction in total antenna efficiency when communicating using the one or more upper frequency bands. The device processing electronics are in one implementation configured to detect the reduced antenna performance, and switch over the communication signal path from the main feed structure 430 to the HB antenna feed structure 432. This signal path adjustment corresponds to the RF engine 102 directing the switching element 110 over the control line 104 to switch feed signal from the signal path 108 to the signal path 112, shown in FIG. 1.

Figure 5:
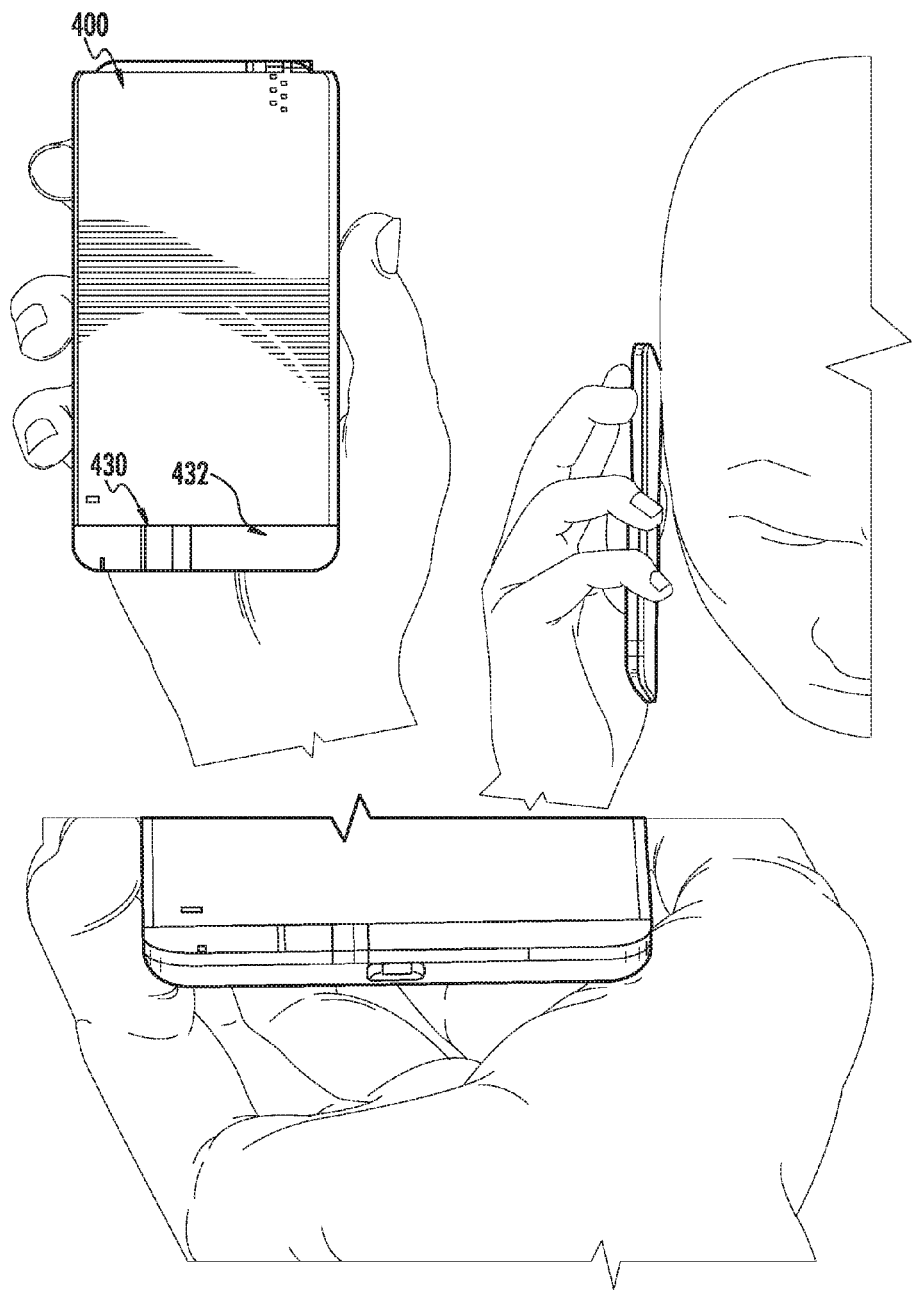
FIG. 5 is a graphical illustration depicting operational placement of the mobile communications device of, e.g., FIG. 2A in the user right hand and near the head, in accordance with one implementation.

FIGS. 5-6 illustrate exemplary scenarios of operational placement of a mobile communications device (e.g., the device 400 of FIGS. 4A-4B), near the user's head, and in the user right or left hand, respectively. As shown in FIG. 5, when the device 400 is placed in the user's right hand and near the user's head, the HB antenna radiator portion may become at least partly blocked. The device 400 processing electronics is configured to mitigate the partial antenna blocking by switching over the feed signal from the HB feed 432 to the main feed 430.

When the device 400 is placed in the user's left hand and near the user's head, the main antenna radiator portion may become at least partly blocked. The device 400 processing electronics mitigates the partial antenna blocking by switching over the feed signal from the main feed 430 to the HB feed 432.

The operational configurations of the device 400 illustrated in FIGS. 4A-6 have been used by the Assignee hereof during simulation and testing of an exemplary antenna apparatus constructed according to one embodiment of the disclosure, as described in detail below with respect to FIGS. 9A-13.

Figure 7:
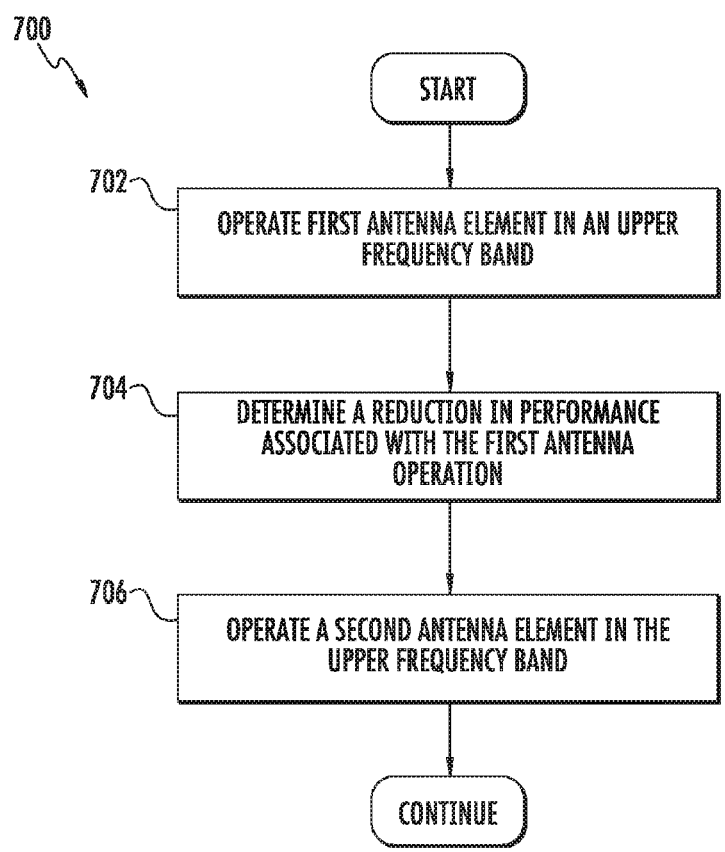
FIG. 7 is a logical flow diagram illustrating exemplary operation of the switched dual radiator antenna apparatus, in accordance with one or more implementations.
Figure 8:
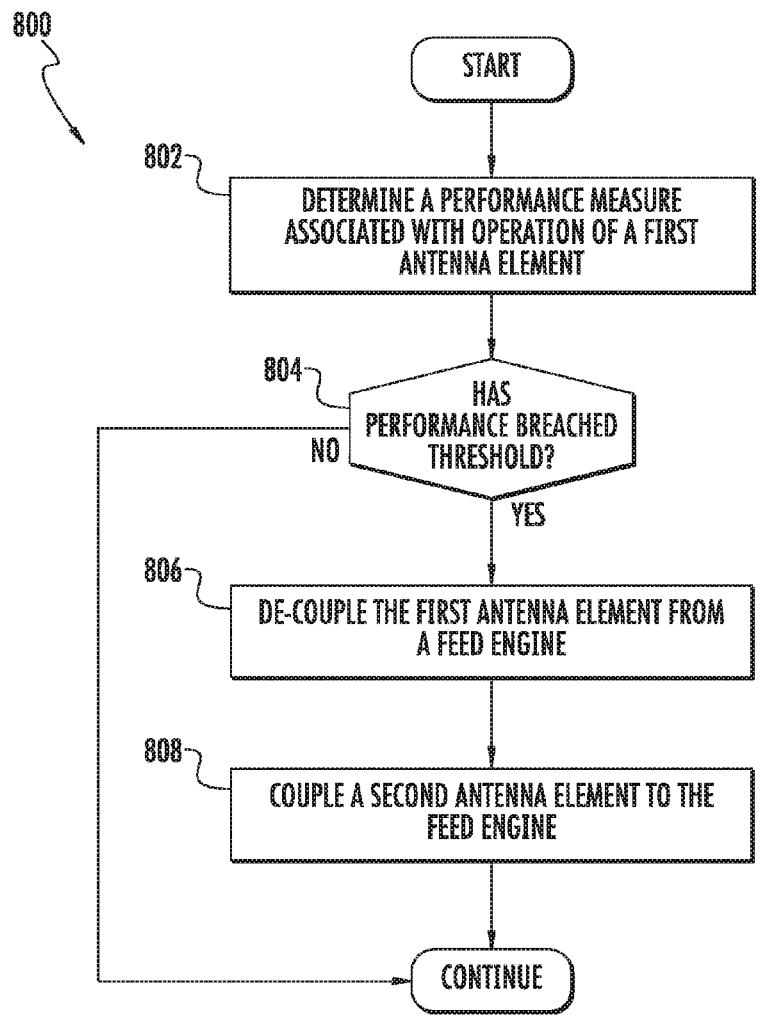
FIG. 8 is a logical flow diagram illustrating one embodiment of a radiator switching method for use with of the mobile communications apparatus of e.g., FIGS. 2A-2F.

FIGS. 7-8 illustrate methods of operating an exemplary embodiment of the switched antenna apparatus of the disclosure, in accordance with one or more implementations. The operations of methods 700, 800 presented below are intended to be illustrative. In some implementations, methods 700, 800, may be accomplished with one or more additional operations not described, and/or without one or more of the operations discussed. Additionally, the order in which the operations of methods 700, 800 are illustrated in FIGS. 7-8 described below is not intended to be limiting.

In some implementations, methods 700, 800 may be implemented in one or more processing devices (e.g., a digital processor, an analog processor, a digital circuit designed to process information, an analog circuit designed to process information, a state machine, and/or other mechanisms for electronically processing information and/or execute computer program modules). The one or more processing devices may include one or more devices executing some or all of the operations of methods 700, 800 in response to instructions stored electronically on an electronic storage medium. The one or more processing devices may include one or more devices configured through hardware, firmware, and/or software to be specifically designed for execution of one or more of the operations of methods 700, 800.

FIG. 7 illustrates operation of the exemplary switched dual radiator antenna apparatus. The steps of the method 700 may be performed for example by a mobile communications device, such as that described above with respect to FIGS. 2A-2F, or by another entity, or by combinations thereof.

At step 702 of method 700 a first antenna element may be operated in one or more upper frequency bands. In some implementations, the first antenna element operation comprises energizing one of the feed structures 130 or 132 via the respective pathway 108 or 112. The one or more upper frequency bands may include for example one or more of the following: DCS1800, PCS1900, WCDMA1, LTE 7, and/or other bands.

At step 704, a reduction in performance associated with the first antenna operation is determined. In certain cases, the antenna performance reduction may be due to antenna radiator detuning caused by a user placing the device in their right/left hand and/or proximate their head, e.g., as described above with respect to FIGS. 4A-6.

At step 706, a second antenna element is operated in the one or more upper frequency bands. In certain implementations, the second antenna element operation comprises energizing the other one of the two feed structures 132 or 130 via the respective pathway 112 or 108.

It will also be appreciated that in certain implementations, the two feeds may be operated simultaneously, such as e.g., in the case of a MIMO or other implementation with multiple transmission/receiving elements.

FIG. 8 illustrates an exemplary embodiment of a radiator switching method for use with of the mobile communications apparatus of e.g., FIG. 2, in accordance with the present disclosure.

At step 802 of the method 800, a performance measure associated with the operation of a first antenna may be determined. In one or more implementations, the performance measure may comprise antenna efficiency (e.g., of Eqn. 1) and/or a return loss.

At step 804, a determination may be made as to whether the antenna performance breached a threshold or acceptability criterion. In one or more implementations, the threshold may comprise minimum target efficiency, selected, for example at 15% (about −8 dB). This exemplary value is selected based on the simulated BHH performances, although it will be appreciated that other values and/or selection criteria may be utilized.

The performance of step 802 may be determined instantaneously, or over a time interval such as one selected from the range between a first value and a second value (e.g., temporal averaging performed to identify sustained low performance), in some embodiments, or in other cases, over multiple different time intervals (and e.g., averaged).

Responsive to a determination that the performance has breached the threshold/criterion, the method proceeds to step 806, wherein the first antenna element may be decoupled from the RF engine (e.g., element 102 in FIG. 1).

At step 808, a second antenna element is coupled to the feed engine. In some embodiments, the de-coupling/coupling operations of steps 806/808 may be effectuated by the RF engine 102 directing the switching element 110 to alter the feed signal path from one of the paths (e.g., 108 or 112) to the other path (e.g., 112 or 108). This may occur substantially simultaneously if desired, or in a "break before make" type sequence so as to decouple the first element before the second element is coupled.

Performance

FIGS. 9A through 14B present performance results obtained during simulation and testing by the Assignee hereof of an exemplary antenna apparatus configured according to one or more embodiments described above with respect to FIGS. 1 and 2A-2F.

The data presented in FIGS. 9A-9D depict free-space return loss (in dB) as a function of frequency for the main S11 (solid unmarked curves) and HB S22 (solid curves marked with 'x') antenna radiators (e.g., comprising the feed structures 130, 132 in FIG. 1 or 430, 432 in FIG. 4A). The data in FIG. 9A correspond to antenna radiators operating in exemplary LTE 17 and LTE 12 bands. Data in FIG. 9B correspond to antenna radiators operating in exemplary LTE 14, LTE 13, DCS1800, PCS1900, and WCDMA1 bands. The data in FIG. 9C correspond to antenna radiators operating in an exemplary LTE 20 band. The data in FIG. 9D correspond to antenna radiators operating in exemplary GSM 850 and GSM900 bands. The curves marked with designators 900, 910, 920, 930 in FIGS. 9A-9D denote the performance of the main antenna radiator (e.g., 130 in FIG. 1), while the curves marked with designators 902, 912, 922, 932 in FIGS. 9A-9D denote the performance of the HB antenna radiator (e.g., 132 in FIG. 1).

Figure 9A:
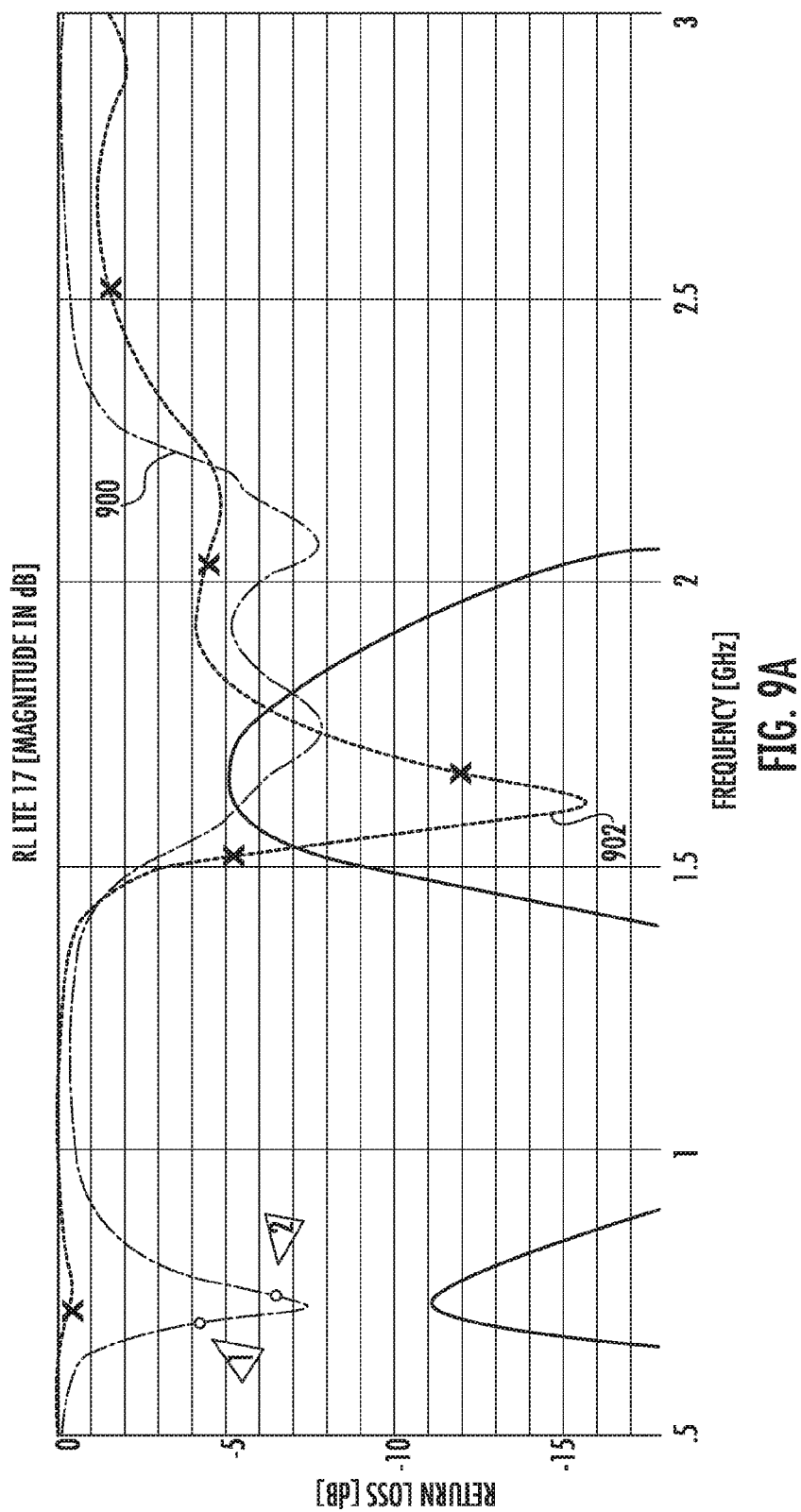
FIG. 9A depicts free-space return loss (in dB) as a function of frequency for exemplary LTE 17 and LTE 12 bands, obtained using the exemplary antenna apparatus of FIG. 1.
Figure 9B:
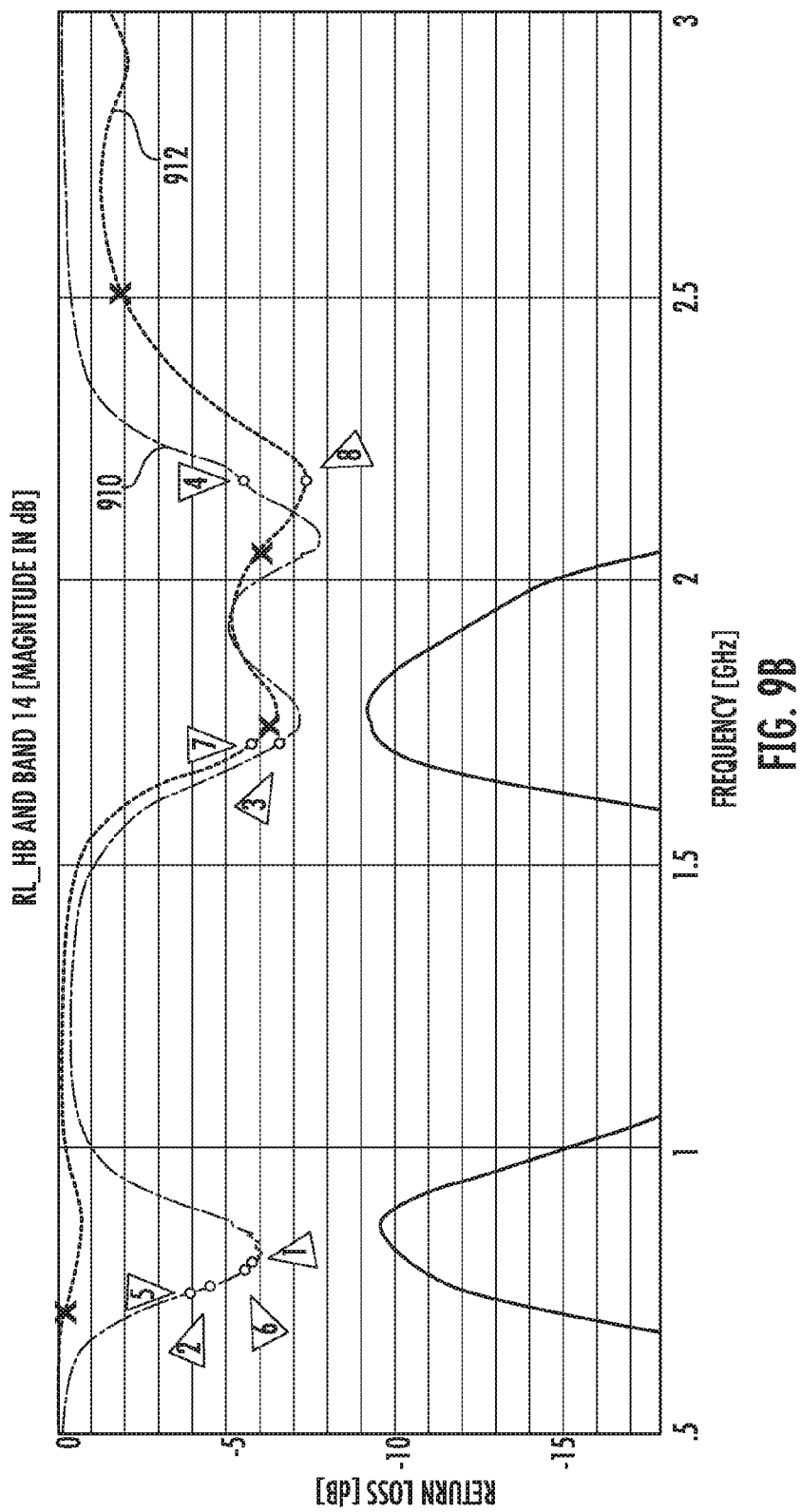
FIG. 9B depicts free-space return loss (in dB) as a function of frequency for exemplary LTE 14, LTE 13, DCS1800, PCS1900 and WCDMA1 bands, obtained using the exemplary antenna apparatus of FIG. 1.
Figure 9C:
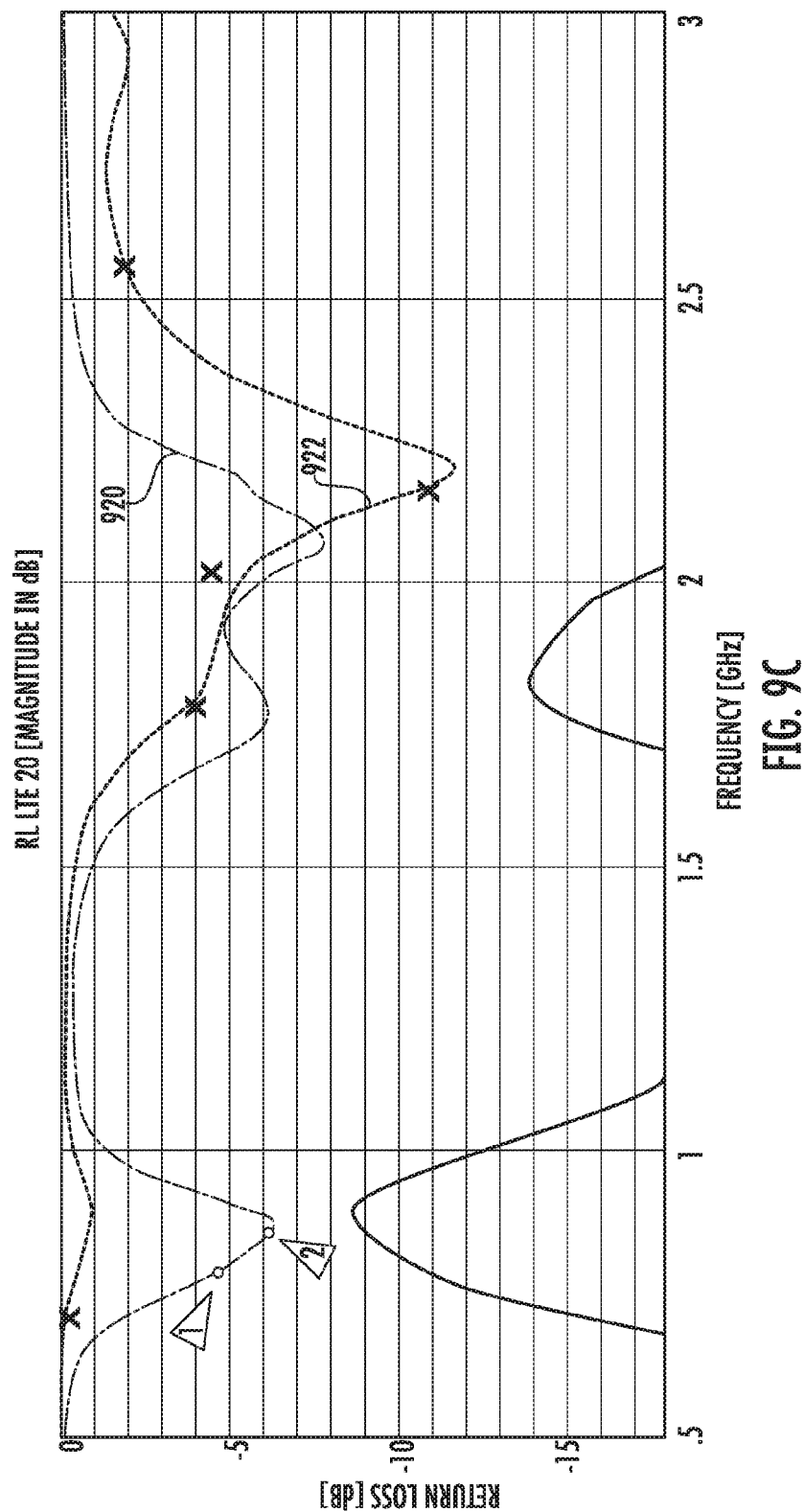
FIG. 9C depicts free-space return loss (in dB) as a function of frequency for an exemplary LTE 20 band, obtained using the exemplary antenna apparatus of FIG. 1.
Figure 10:
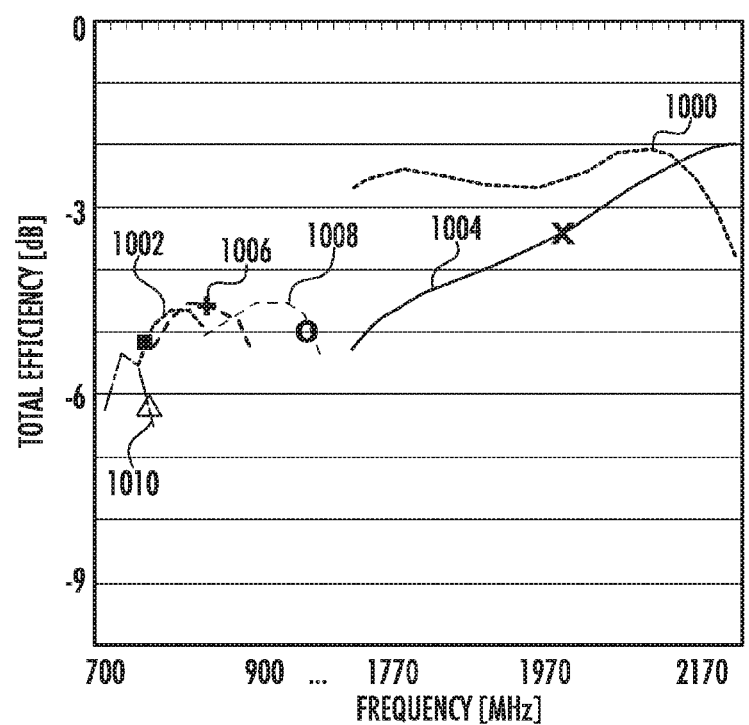
FIG. 10 is a plot of total free space efficiency as a function of frequency, obtained using the exemplary antenna apparatus of FIG. 1.

FIG. 10 presents data regarding free-space efficiency obtained for the same antenna apparatus as described above with respect to FIGS. 9A-9D (e.g., the antenna 100 of FIG. 1). Efficiency of an antenna (in dB) is may be defined decimal logarithm of a ratio of radiated to input power:

$$AntennaEfficiency = 10\log_{10}\left(\frac{\text{Radiated Power}}{\text{Input Power}}\right) \quad \text{(Eqn. 1)}$$

An efficiency of zero (0) dB corresponds to an ideal theoretical radiator, wherein all of the input power is radiated in the form of electromagnetic energy.

The curve marked with designator 1000 in FIG. 10 corresponds to operating the main antenna feed (e.g., 130 in FIG. 1) in the upper frequency bands (e.g., DCS1800, PCS1900, WCDMA-1 bands). The curve marked with designator 1002 and a solid square marker in FIG. 10 corresponds to operating the main antenna feed in the lower frequency (e.g., LTE 14, LTE 13) bands. The curve marked with designator 1004 and marker X in FIG. 10 corresponds to operating the HB antenna feed (e.g., 132 in FIG. 1) in the upper frequency (e.g., DCS1800, PCS1900, WCDMA-1) bands, while the curves marked with designators 1006 and marker +, designator 1008 and marker O, and designator 1010 and solid triangle marker correspond to operating the main antenna feed in the (i) LTE 20, (ii) GSM 850/GSM900 and (iii) LTE17/LTE12 lower frequency bands, respectively.

Figure 11:
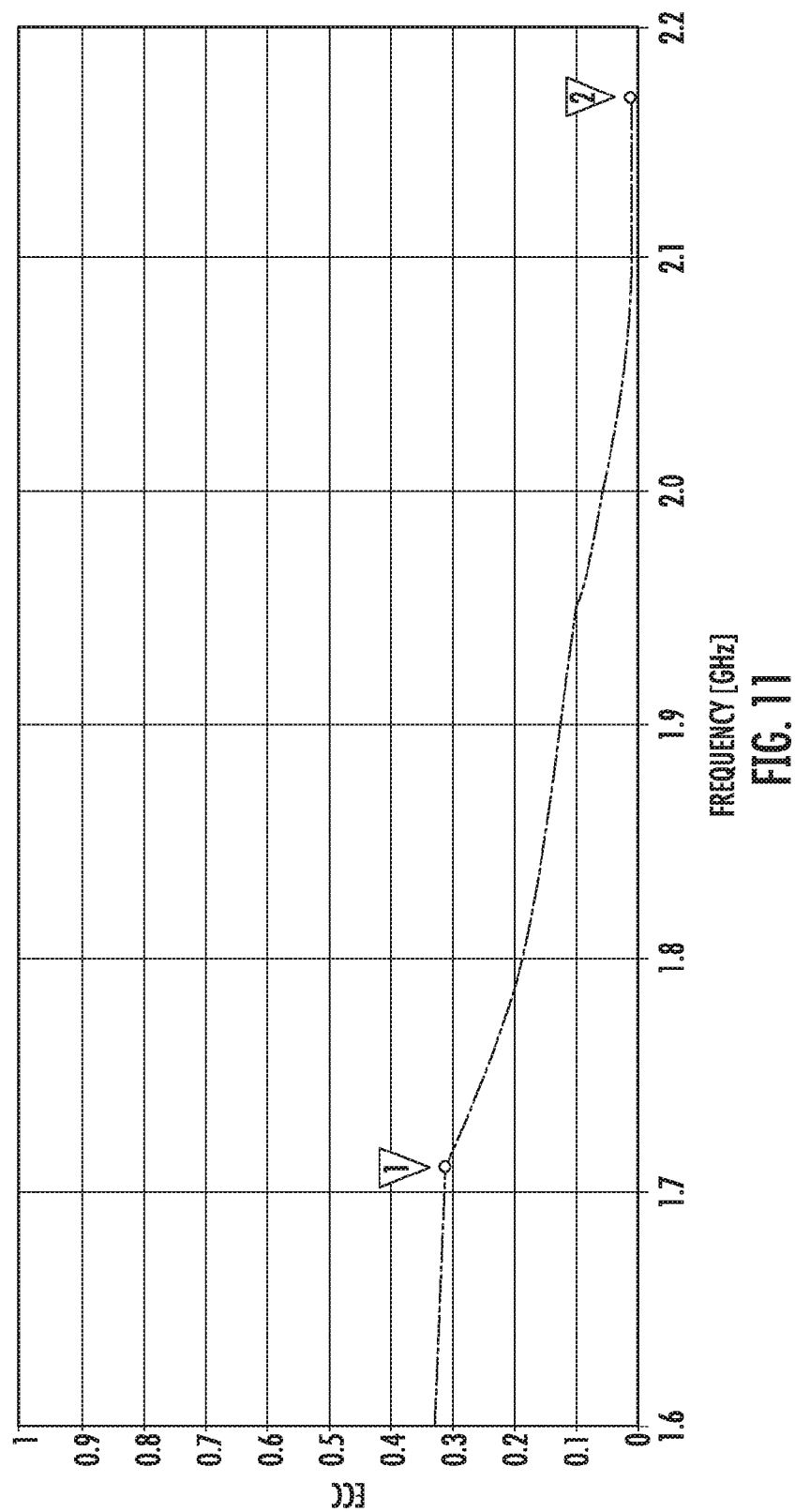
FIG. 11 is a plot of total envelope correlation coefficient as a function of frequency obtained using the exemplary antenna apparatus of FIG. 1.
Figure 12A:
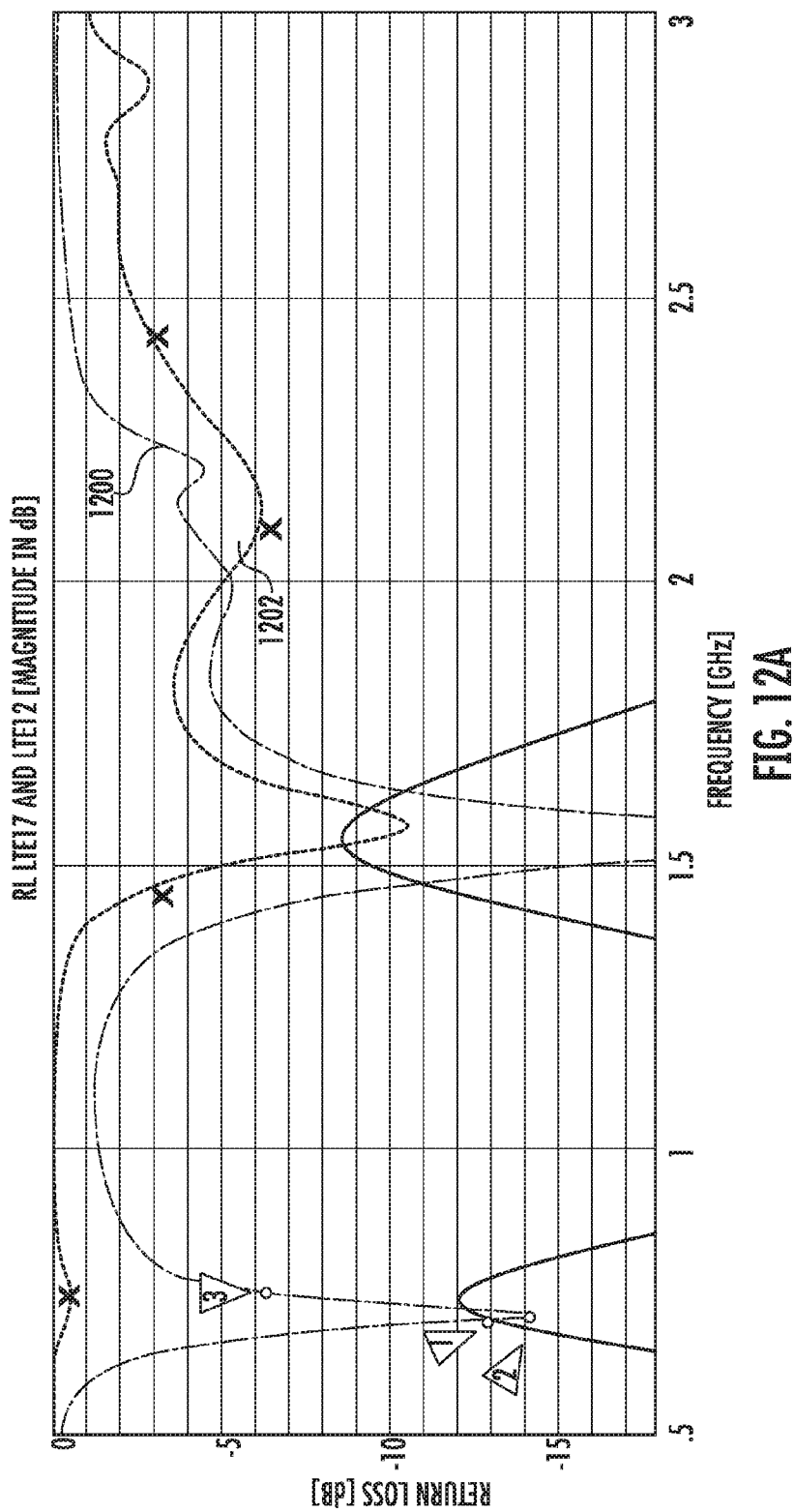
FIG. 12A depicts loss (in dB) as a function of frequency for the LTE 17 and LTE 12 operating bands, obtained using the mobile device configuration shown in FIG. 6; i.e., head with hand, left cheek (BHHL).
Figure 12C:
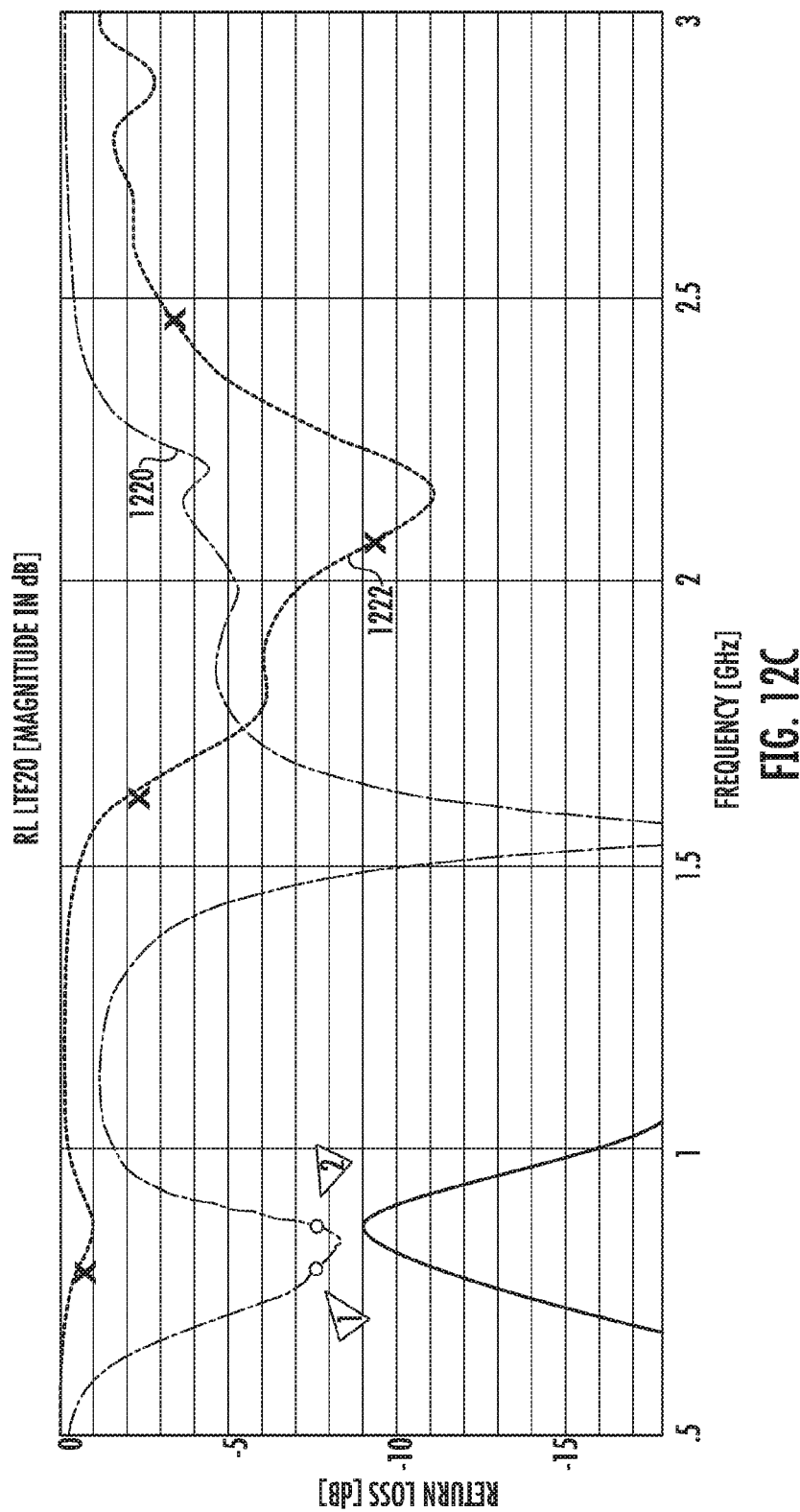
FIG. 12C depicts loss (in dB) as a function of frequency for the LTE 20 operating band, obtained using the mobile device configuration shown in FIG. 6; i.e., head with hand, left cheek (BHHL).
Figure 12D:
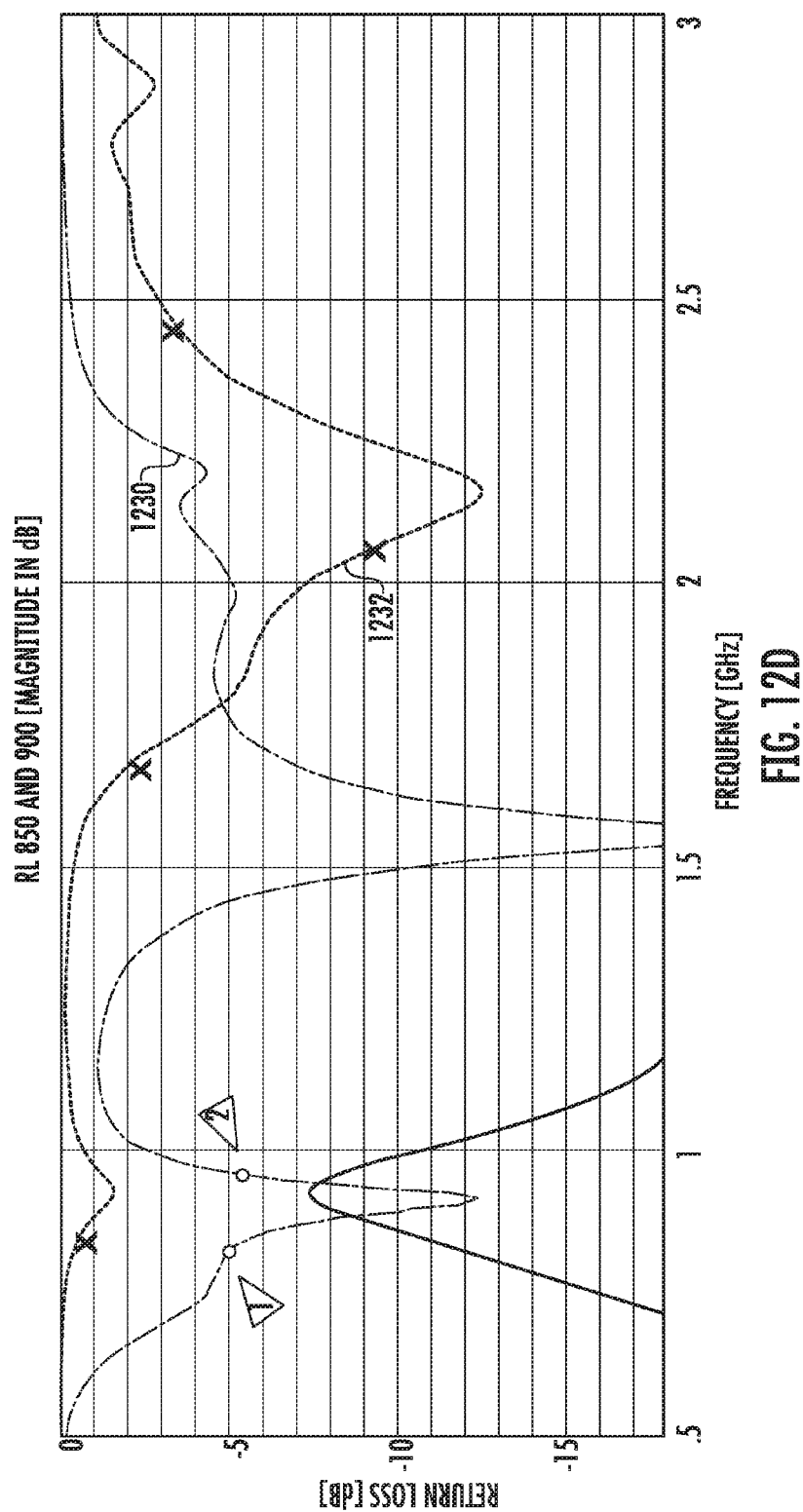
FIG. 12D depicts loss (in dB) as a function of frequency for the GSM 850 and GSM 900 operating bands, obtained using the mobile device configuration shown in FIG. 6; i.e., head with hand, left cheek (BHHL).
Figure 13A:
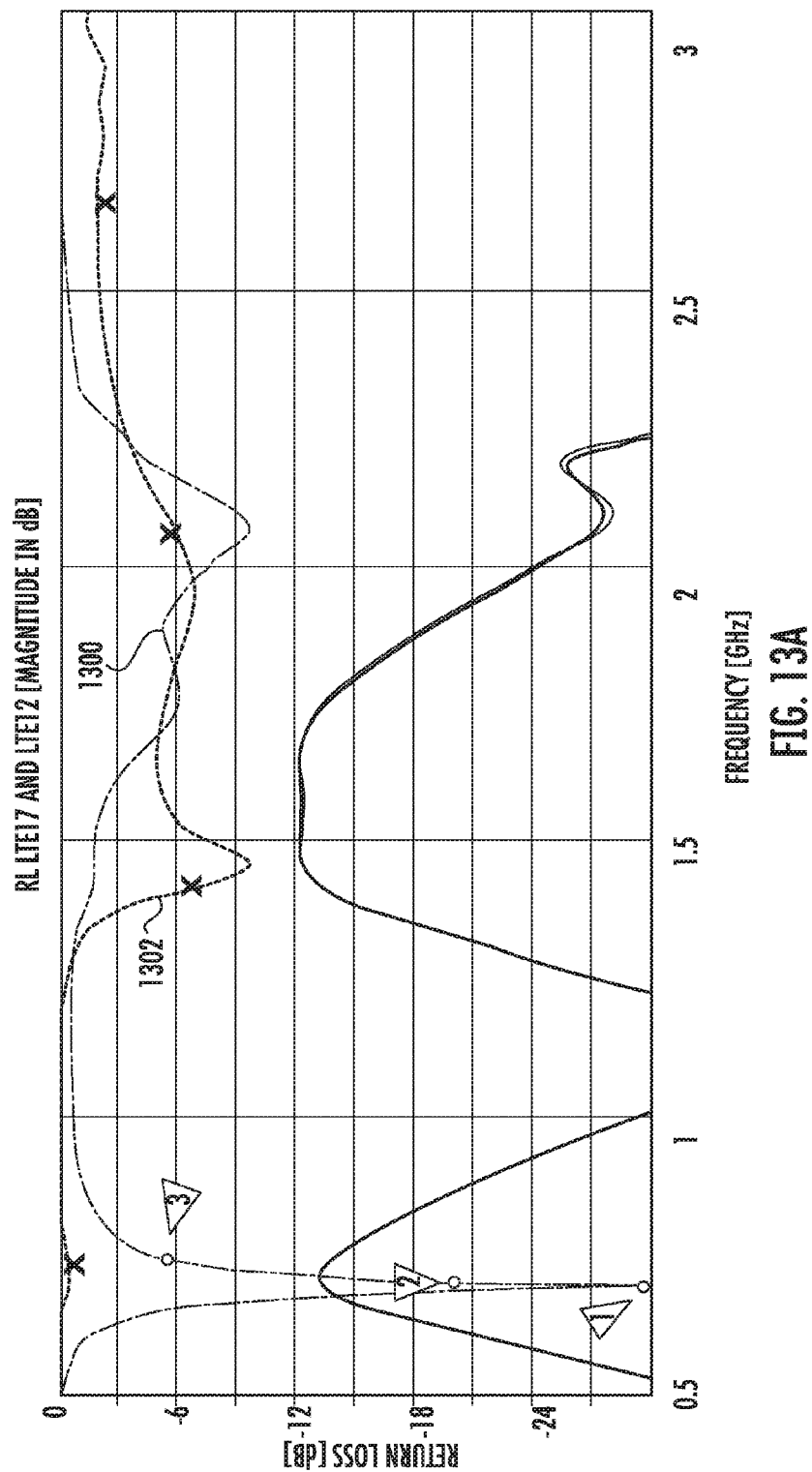
FIG. 13A depicts loss (in dB) as a function of frequency for the LTE 17 and LTE 12 operating bands, obtained using the mobile device configuration shown in FIG. 5; i.e., head with hand, right cheek (BHHR).
Figure 13B:
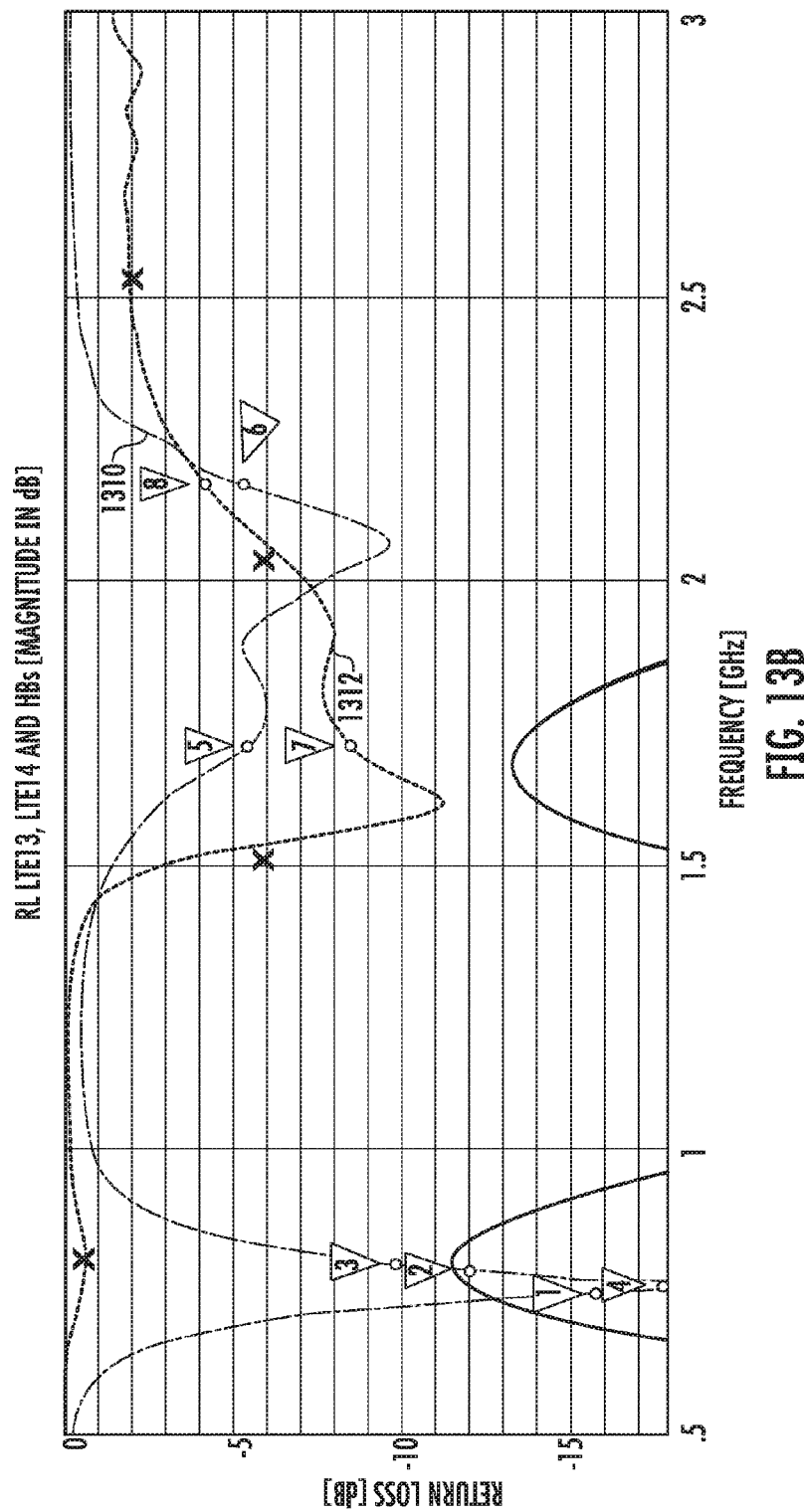
FIG. 13B depicts loss (in dB) as a function of frequency for the LTE 14, LTE 13, DCS 1800, PCS 1900 and WCDMA1 operating bands, obtained using the mobile device configuration shown in FIG. 5; i.e., head with hand, right cheek (BHHR).
Figure 13C:
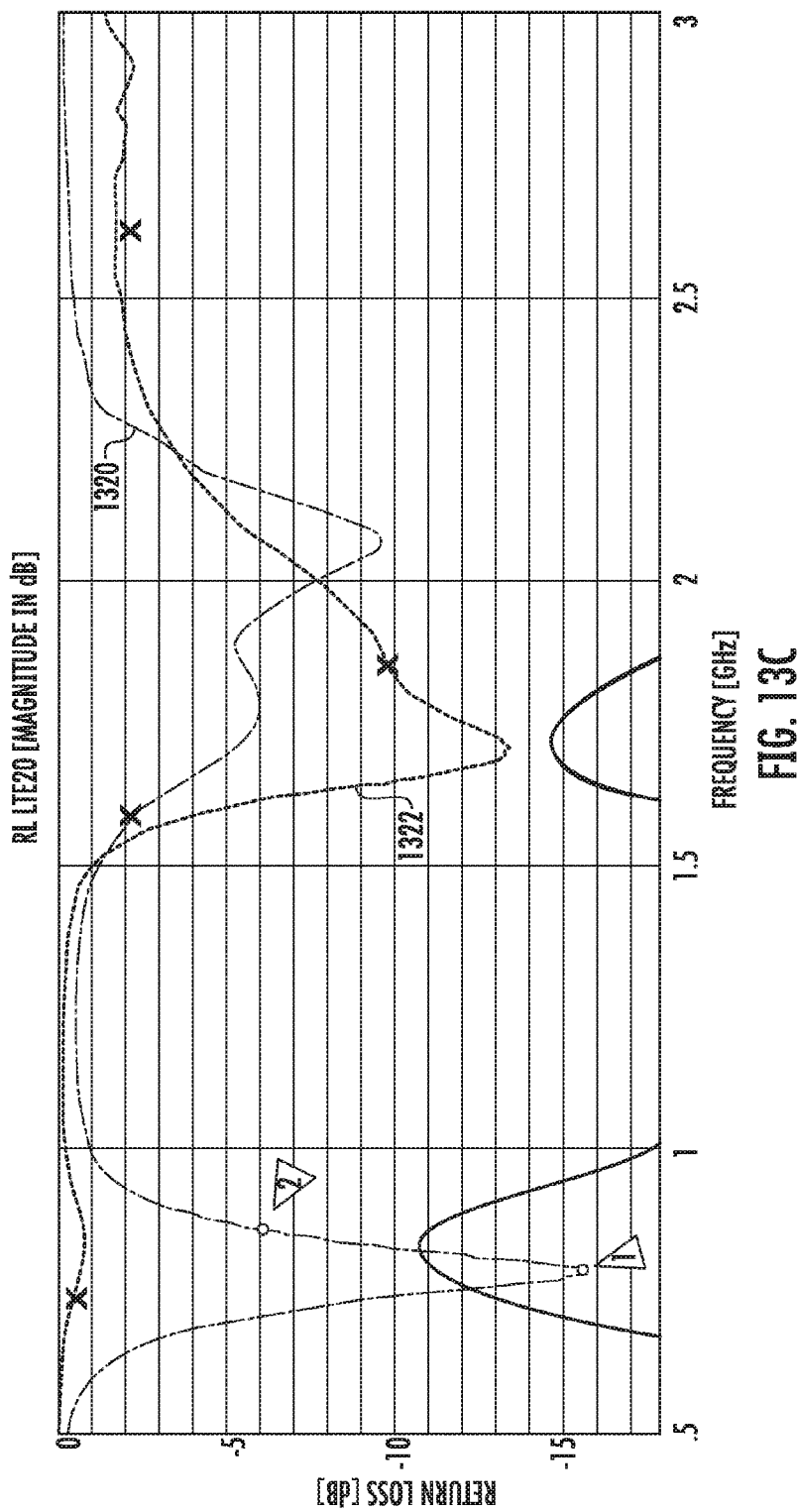
FIG. 13C depicts loss (in dB) as a function of frequency for the LTE 20 operating band, obtained using the mobile device configuration shown in FIG. 5; i.e., head with hand, right cheek (BHHR).
Figure 13D:
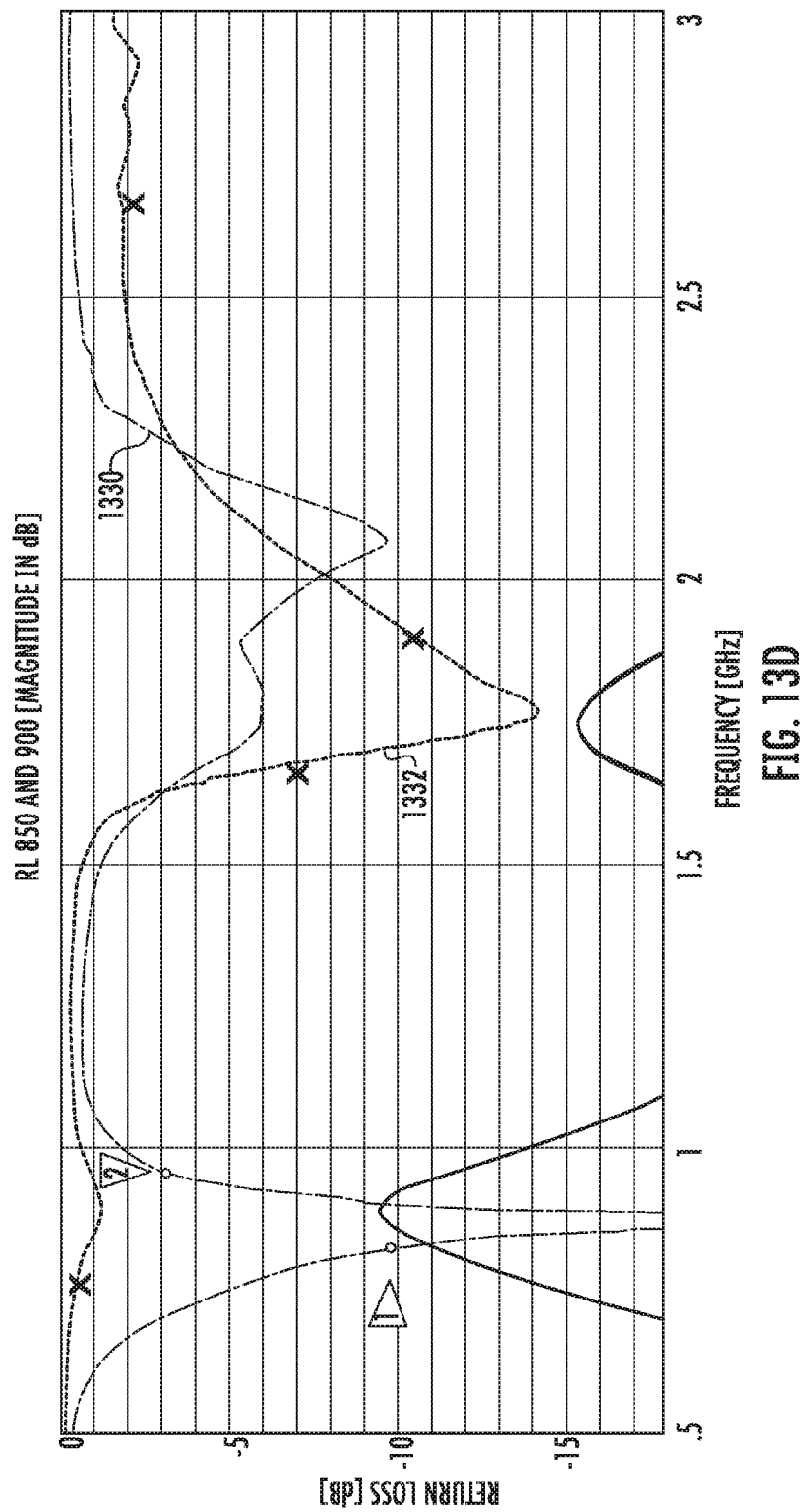
FIG. 13D depicts loss (in dB) as a function of frequency for the GSM 850 and GSM 900 operating bands, obtained using the mobile device configuration shown in FIG. 5; i.e., head with hand, right cheek (BHHR).

FIG. 11 presents data regarding free-space envelope correlation coefficient efficiency for the same antenna apparatus as described above with respect to FIGS. 9A-9D (e.g., the antenna 100 of FIG. 1). The data presented in FIG. 11 were obtained in upper frequency band between 1710 MHz and 2170 MHz.

The data presented in FIGS. 9A-10 may be used as a reference when evaluating performance of the exemplary antenna operable in-hand and/or near the user's head, as described below with respect to FIGS. 12A-14B.

FIGS. 12A-12D depict return loss (in dB) as a function of frequency obtained according to a CTIA v3.1 "beside head with hand, left cheek (BHHL)" measurement configuration. The data in FIG. 12A correspond to antenna radiators operating in LTE 17 and LTE 12 bands. The data in FIG. 12B correspond to antenna radiators operating in LTE 14, LTE 13, DCS1800, PCS1900, and WCDMA1 bands. The data in FIG. 12C correspond to antenna radiators operating in LTE 20 band. The data in FIG. 12D correspond to antenna radiators operating in GSM 850 and GSM900 bands. The curves marked with designators 1200, 1210, 1220, 1230 in FIGS. 12A-12D denote the performance of the main antenna radiator (e.g., 430 in FIG. 6), while the curves marked with designators 1202, 1212, 1222, 1232 in FIGS. 12A-12D denote the performance of the HB antenna radiator (e.g., 432 in FIG. 6).

FIGS. 13A-13D depict return loss (in dB) as a function of frequency obtained according to CTIA v3.1 "beside head with hand, left cheek (BHHL)" measurement configuration. The data in FIG. 13A correspond to antenna radiators operating in LTE 17 and LTE 12 bands. The data in FIG. 13B correspond to antenna radiators operating in LTE 14, LTE 13, DCS1800, PCS1900, and WCDMA1 bands. The data in FIG. 13C correspond to antenna radiators operating in LTE 20 band. The data in FIG. 13D correspond to antenna radiators operating in GSM 850 and GSM900 bands. The curves marked with designators 1300, 1310, 1320, 1330 in FIGS. 13A-13D denote the performance of the main antenna radiator (e.g., 430 in FIG. 5), while the curves marked with designators 1302, 1313, 1322, 1332 in FIGS. 13A-13D denote the performance of the HB antenna radiator (e.g., 432 in FIG. 5).

Figure 14B:
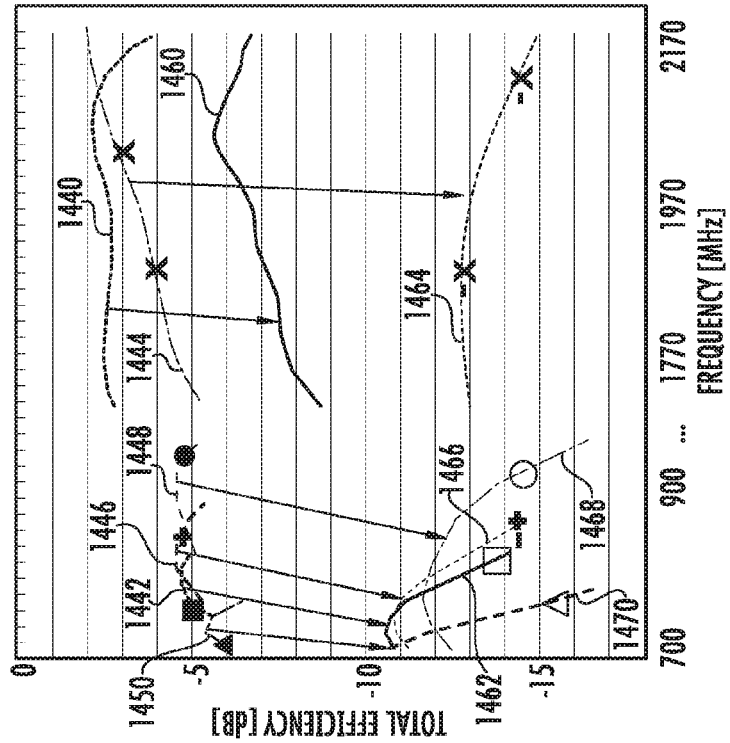
FIG. 14B antenna efficiency (in dB) as a function of frequency obtained using the mobile device configuration shown in FIG. 5; i.e., head with hand, right check (BHHR).
Figure 14A:
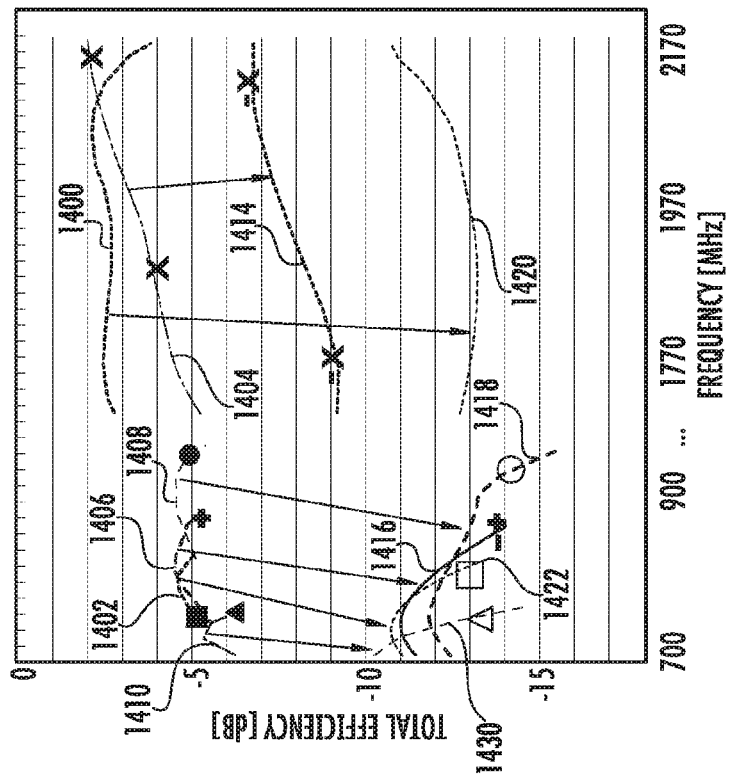
FIG. 14A antenna efficiency (in dB) as a function of frequency obtained using the mobile device configuration shown in FIG. 6; i.e., head with hand, left cheek (BHHL).

FIG. 14A presents a comparison of data regarding antenna efficiency obtained in free space versus data obtained according to CTIA v3.1BHHL measurement configuration using the dual radiator antenna of, e.g., FIG. 1 (i.e., comprising main and HB radiators).

The curves marked with designators 1400 through 1410 in FIG. 14A depict antenna efficiency in free space. The curves marked with designator 1420 through 1430 in FIG. 14A depict antenna efficiency for BHHL. The curves marked with designators 1400 and 1420 present data obtained when operating the main antenna feed (e.g., 130 in FIG. 1) in upper frequency bands (e.g., DCS1800, PCS1900, WCDMA-1 bands). The curves marked with designator 1402 and a solid square marker and 1422 and an open square marker corresponds to operating the main antenna feed in lower frequency (e.g., LTE 14, LTE 13) bands. The curves marked with designator 1404 and marker X and designator 1414 and marker '–X' correspond to operating the HB antenna feed (e.g., 132 in FIG. 1) in upper frequency (e.g., DCS1800, PCS1900, WCDMA-1) bands. The curves marked with designator 1406 and marker + and designator 1406 and marker '–+' correspond to operating the main antenna feed in LTE 20 band. The curves marked with designator 1408 and solid circle marker and designator 1428 and open circle marker correspond to operating the main antenna feed in GSM 850/GSM900 bands. The curves marked with designator 1410 and solid triangle marker and designator 1430 and open triangle marker correspond to operating the main antenna feed in LTE 17/LTE 12 bands.

FIG. 14B presents a comparison of data regarding antenna efficiency obtained in free space versus data obtained according to CTIA v3.BHHR measurement configuration using the dual radiator antenna of, e.g., FIG. 1 (i.e., comprising main and HB radiators). The curves marked with designators 1440 and 1460 present data obtained when operating the main antenna feed (e.g., 130 in FIG. 1) in upper frequency bands (e.g., DCS1800, PCS1900, WCDMA-1 bands). The curves marked with designator 1442 and a solid square marker and 1462 and an open square marker corresponds to operating the main antenna feed in lower frequency (e.g., LTE 14, LTE 13) bands. The curves marked with designator 1444 and marker X and designator 1454 and marker '–X' correspond to operating the HB antenna feed (e.g., 132 in FIG. 1) in upper frequency (e.g., DCS1800, PCS1900, WCDMA-1) bands. The curves marked with designator 1446 and marker + and designator 1466 and marker '–+' correspond to operating the main antenna feed in LTE 20 band. The curves marked with designator 1448 and solid circle marker and designator 1468 and open circle marker correspond to operating the main antenna feed in GSM 850/GSM900 bands. The curves marked with designator 1450 and solid triangle marker and designator 1470 and open triangle marker correspond to operating the main antenna feed in LTE 17/LTE 12 bands.

As may be seen from the data presented in FIGS. 12A-14B, the lower band and upper band of the dedicated HB antenna (e.g., 432 in FIG. 5) become de-tuned when the antenna apparatus is placed in the user's right hand besides head, while the main antenna radiator (e.g., 430 in FIG. 5) HB radiator remains in-band. The HB antenna radiator BHHR performance reduction in the lower band is between about 6 dB and about 9 dB, while in the upper frequency band, the reduction is between about 3 dB and 6 dB.

When the antenna apparatus is placed in the left hand besides left cheek (BHHL), the lower band and upper band of the main antenna radiator (e.g., 430 in FIG. 6) become de-tuned, while the HB radiator remains in band. The main antenna BHHL performance reduction in the lower band is between about 6 dB and about 9 dB, while in the upper frequency band, the reduction is between about 3.5 dB and 5 dB.

The present disclosure provides for an antenna apparatus comprising multiple (e.g., dual) upper band radiators. The two radiators may be configured to operate within one or more upper frequency bands (e.g., DCS1800, PCS1900, WCDMA1, LTE 7, and/or other) while being disposed within the same metal enclosure of a handheld communications device. The upper band radiator switching methodology described herein enables inter alia, automatic switchover of a detuned antenna radiator to another radiator in order to maintain antenna performance when the device in placed in a user's hand and/or near a user's head. Placement of the two radiators within the same enclosure provides for a smaller and/or a lower cost device. Furthermore, the antenna switchover capability described herein improves antenna operational robustness, and enables the communications device to maintain uninterrupted communications while in-hand and/or beside the user's head.

It will be recognized that while certain aspects of the disclosure are described in terms of a specific sequence of steps of a method, these descriptions are only illustrative of the broader methods, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure and claims provided herein.

While the above detailed description has shown, described, and pointed out novel features as applied to various embodiments, it will be understood that various omissions, substitutions, and changes in the form and details of the device or process illustrated may be made by those skilled in the art. The foregoing description is of the best mode presently contemplated. This description is in no way meant to be limiting, but rather should be taken as illustrative of the general principles of the disclosure.

What is claimed is:

1. A mobile radio frequency communication device, comprising:
    an enclosure and an electronics assembly contained substantially therein, said electronics assembly comprising a ground plane and a first and a second feed port; and
    a multiband antenna apparatus, comprising:
        a metal cup structure disposed proximate one end of the enclosure and configured to be electrically connected to the ground plane via a first and a second ground element;
        a first and a second feed structure;
        a ground structure configured to be electrically connected to the ground plane; and
        a selector apparatus configured to selectively electrically connect one of (i) the first feed structure to the first feed port or (ii) the second feed structure to the second feed port;
    wherein:
        the first feed structure is configured to effectuate radio frequency communications within at least one high frequency band and at least one low frequency band;
        the second feed structure is configured to effectuate the radio frequency communications within the at least one high frequency band;
        the enclosure comprises a chassis and the cup, the cup being electrically separated from the chassis by a non-conductive slot thereby forming an operational antenna portion, the operational portion configured to form a first electromagnetic resonance in at least a second high frequency band;
        the second ground element is configured to be connected to the ground plane via a switching circuit comprising two or more alternate electrical signal paths; and
        the metal cup structure is configured to form a second electromagnetic resonance in at least a fourth and a third frequency bands.

2. The mobile radio frequency communication device of claim 1, further comprising a radiator structure disposed to substantially envelop one lateral end of the multiband antenna apparatus, and configured to be electrically connected to the ground plane.

3. The mobile radio frequency communication device of claim 2, wherein the two or more alternate electrical signal paths each comprise a reactive circuit characterized by a respective impedance value configured to enable selective tuning of an operational band of the radiator structure.

4. The mobile radio frequency communication device of claim 3, wherein:
    the at least one low frequency band comprises two or more low frequency bands; and
    the operational band is selected from the two or more low frequency bands.

5. The mobile radio frequency communication device of claim 1, wherein:
    the first ground element comprises a static ground element characterized by a single connection state;
    the first feed structure comprises a first matching circuit configured to be coupled to the first feed port, and to tune an antenna operation to the at least one high frequency band; and
    the second feed structure comprises a second matching circuit configured to be coupled to the second feed port, and to tune the antenna operation to the at least one high frequency band.

6. The mobile radio frequency communication device of claim 5, wherein:
    individual ones of the first and the second matching circuits comprise a reactive circuit; and
    the selective electrical connection of the first or the second feed structure to the first or second feed port, respectively, is effectuated by the switching circuit based at least on a determination of a performance measure associated with operation of the antenna in at least the at least one high frequency band.

7. The mobile radio frequency communication device of claim 1, wherein:
    the at least one high frequency band comprises a first and the second high frequency band;
    the ground structure is configured to effectuate radio frequency communications within the second high frequency band;
    individual ones of the first feed structure and the second feed structure are configured to effectuate the radio frequency communications within the first high frequency band; and
    the radio frequency communications via the first feed structure and the second feed structure are configured to occur in alternate time intervals with one another.

8. The mobile radio frequency communication device of claim 1, wherein the low frequency band comprises a GSM band, and the first and the second high frequency bands are selected from a group consisting of DCS1800 (1710 MHz to 1880 MHz), PCS1900 (1850 MHz to 1990 MHz), WCDMA1 (1920 MHz to 2170 MHz), and LTE 7 (2500 MHz to 2690 MHz) bands.

9. The mobile radio frequency communication device of claim 2, wherein the enclosure comprises a metallic enclosure.

10. The mobile radio frequency communication device of claim 9, wherein:

the mobile radio frequency communication device comprises top and bottom plane sides;
the enclosure comprises a first electrically conductive surface; and
the radiator structure comprises the cup structure, the cup structure having a second electrically conductive surface; and
wherein the non-conductive slot is configured to electrically isolate the first electrically conductive surface from the second electrically conductive surface along at least one of the top and the bottom plane sides.

11. The mobile radio frequency communication device of claim 10, wherein:
the radiator structure is characterized by width, depth and length dimensions; and
the non-conductive slot is characterized by a width dimension smaller than individual ones of the width, depth and length dimensions.

12. The mobile radio frequency communication device of claim 11, wherein the first and the second feed structures are spaced from one another laterally by a distance that is greater than at least one of: (i) five times a width of individual feed elements; or (ii) twice the depth of the radiator structure.

13. The mobile radio frequency communication device of claim 1, wherein:
the at least one high frequency band comprises the third and the fourth upper frequency bands;
the radiator structure is configured to form the second electromagnetic resonance in at least the third and the fourth upper frequency bands; and
individual ones of the first, the second, the third and the fourth upper frequency bands are characterized by a center frequency and a bandwidth, the individual center frequencies being separated by at least one-half (½) of the respective bandwidth.

14. The mobile radio frequency communication device of claim 1, wherein individual ones of the first and the second feed structures are configured to electromagnetically couple to the radiator structure, the electromagnetic coupling being characterized by an absence of a galvanic path from the radiator structure to any of the first or the second feed structure.

15. The mobile radio frequency communication device of claim 1, wherein individual ones of the first and the second feed structures are configured to electromagnetically couple to the ground structure, the electromagnetic coupling being characterized by an absence of a galvanic path from the ground structure to any of the first or the second feed structure.

16. The mobile radio frequency communication device of claim 1, wherein the low frequency band comprises two or more bands selected from the group consisting of LTE 12 (698 MHz to 746 MHz), LTE 17 (704 MHz to 746 MHz), LTE 13 (746 MHz to 787 MHz), LTE 14 (758 MHz to 798 MHz), LTE 20 (791 MHz to 862 MHz), GSM850 (824 MHz to 894 MHz), and E-GSM-900 (880 MHz to 960 MHz) bands; and
the high frequency band comprises two or more bands selected from the group consisting of DCS1800 (1710 MHz to 1880 MHz), PCS1900 (1850 MHz to 1990 MHz), WCDMA1 (1920 MHz to 2170 MHz), and LTE7 (2500 MHz to 2690 MHz) bands.

17. A multiband antenna apparatus for use in a radio communications device, the antenna apparatus comprising:
a radiator structure disposed so as to substantially envelop one lateral end of the device, and configured to be electrically connected to a ground plane of the device;
a first and a second feed structure configured to be selectively connected to a radio frequency feed port;
a ground structure, configured to be electrically connected to the ground plane; and
a metal cup structure disposed proximate one end of the radio communications device and configured to be electrically connected to the ground plane via a first ground element and a second ground element;
wherein:
the first feed structure is configured to effectuate radio frequency communications within at least one upper frequency band and at least one lower frequency band; and
the second feed structure is configured to effectuate radio frequency communications within the at least one upper frequency band; and
the metal cup structure is configured to form an electromagnetic resonance in at least a third frequency band and a fourth frequency band.

18. The multiband antenna apparatus of claim 17, further comprising a selector apparatus configured to selectively electrically connect one of (i) the first feed structure, or (ii) the second feed structure, to the radio frequency feed port.

19. The multiband antenna apparatus of claim 17, wherein:
the ground plane is connected via first and second ground elements, the second ground element being configured to be connected to the ground plane via a switching circuit comprising two or more alternate electrical signal paths each comprising a reactive circuit characterized by a respective impedance value configured to enable selective tuning of an operational band of the radiator structure;
the at least one lower frequency band comprises two or more lower frequency bands; and
the operational band is selected from the two or more lower frequency bands.

20. The multiband antenna apparatus of claim 17, wherein:
the at least one upper frequency band comprises a first and a second upper frequency band;
the ground structure is configured to effectuate radio frequency communications within the second upper frequency band;
individual ones of the first feed structure and the second feed structure are configured to effectuate radio frequency communications within the first upper frequency band; and
the radio frequency communications via the first feed structure and the second feed structure are configured to occur in alternate time intervals with one another.

21. The multiband antenna apparatus of claim 17, wherein the metal cup structure is configured to cover one end of the radio communications device, and comprises an opening configured to accept an external connector.

* * * * *